US007000828B2

(12) United States Patent
Jones

(10) Patent No.: US 7,000,828 B2
(45) Date of Patent: Feb. 21, 2006

(54) REMOTE AUTOMATED DOCUMENT PROCESSING SYSTEM

(75) Inventor: John E. Jones, Winnetka, IL (US)

(73) Assignee: Cummins-Allison Corp., Mount Prospect, IL (US)

(*) Notice: Subject to any disclaimer, the term of this patent is extended or adjusted under 35 U.S.C. 154(b) by 234 days.

(21) Appl. No.: 09/829,724

(22) Filed: Apr. 10, 2001

(65) Prior Publication Data
US 2002/0145035 A1    Oct. 10, 2002

(51) Int. Cl.
G06F 17/60    (2006.01)
G06F 17/00    (2006.01)

(52) U.S. Cl. .................................. 235/379; 235/375

(58) Field of Classification Search ............... 235/375, 235/379; 382/135, 137–140; 902/22; 705/45
See application file for complete search history.

(56) References Cited

U.S. PATENT DOCUMENTS

| 446,303 A | 2/1891 | Thompson |
| 2,669,998 A | 2/1954 | Buchholz ........................ 133/8 |
| 2,750,949 A | 6/1956 | Kulo et al. ..................... 133/8 |
| 2,835,260 A | 5/1958 | Buchholz ........................ 133/8 |
| 2,936,684 A | 5/1960 | Simjian ........................ 95/1.1 |
| 3,104,314 A | 9/1963 | Simjian ..................... 235/61.9 |
| 3,148,932 A | 9/1964 | Simjian ........................ 346/22 |
| 3,150,912 A | 9/1964 | Simjian ........................ 346/22 |
| 3,246,295 A | 4/1966 | DeClaris et al. ............... 382/56 |
| 3,280,974 A | 10/1966 | Riddle et al. ............ 209/111.8 |
| 3,443,107 A | 5/1969 | Modglin ..................... 250/219 |
| 3,480,785 A | 11/1969 | Aufderheide ............... 250/219 |
| 3,496,370 A | 2/1970 | Haville et al. .............. 250/219 |
| 3,509,535 A | 4/1970 | Berube ....................... 340/149 |
| 3,612,835 A | 10/1971 | Andrews et al. ...... 235/61.11 D |
| 3,618,765 A | 11/1971 | Syoasel et al. ............. 209/122 |
| 3,656,615 A | 4/1972 | Ptacek ......................... 209/73 |
| 3,679,314 A | 7/1972 | Mustert ....................... 356/71 |
| 3,715,031 A | 2/1973 | Okkonen ..................... 209/75 |
| 3,725,667 A | 4/1973 | Schwartz ............. 250/219 DQ |
| 3,764,899 A | 10/1973 | Peterson ................... 324/61 R |
| 3,778,628 A | 12/1973 | Novak et al. ............... 250/556 |
| 3,782,543 A | 1/1974 | Martelli et al. ............... 209/75 |
| 3,798,603 A | 3/1974 | Wahlberg ................... 340/149 |
| 3,800,078 A | 3/1974 | Cochran et al. ............. 178/7.1 |
| 3,806,710 A | 4/1974 | Shigemori et al. ............ 235/92 |
| 3,815,021 A | 6/1974 | Kerr ......................... 324/61 R |

(Continued)

FOREIGN PATENT DOCUMENTS

EP    0 071 421    2/1983

(Continued)

OTHER PUBLICATIONS

AFB Currency Recognition System (1982).

(Continued)

Primary Examiner—Karl D. Frech
Assistant Examiner—April Taylor
(74) Attorney, Agent, or Firm—Jenkens & Gilchrist, P.C.

(57) ABSTRACT

An automated check processing system for accepting and processing checks from a customer, having a plurality of document scanners. The document scanners are adapted to obtain full images of checks fed into the document scanners and to obtain images of selected portions of the checks. A printer may be included for printing an authorization agreement on the checks and for inscribing a transaction amount on the checks. The system also utilizes a conveyor for returning the checks with the agreement to the customer for signing. The image scanned is then communicated to a central clearinghouse via a communication link.

104 Claims, 16 Drawing Sheets

U.S. PATENT DOCUMENTS

| | | | |
|---|---|---|---|
| 3,842,281 A | 10/1974 | Goodrich | 250/461 |
| 3,870,629 A | 3/1975 | Carter et al. | 209/111.8 |
| 3,906,449 A | 9/1975 | Marchak | 340/149 R |
| 3,930,582 A | 1/1976 | Gartner et al. | 209/88 |
| 3,966,047 A | 6/1976 | Steiner | 209/75 |
| 3,976,198 A | 8/1976 | Carnes, Jr. et al. | 209/11.7 T |
| 4,023,011 A | 5/1977 | Nakajima et al. | 235/61.11 R |
| 4,041,456 A | 8/1977 | Ott et al. | 382/135 |
| 4,096,991 A | 6/1978 | Iguchi | 235/419 |
| 4,109,238 A | 8/1978 | Creekmore | 340/149 |
| 4,114,804 A | 9/1978 | Jones et al. | 235/476 |
| 4,147,430 A | 4/1979 | Gorgone et al. | 356/51 |
| 4,166,945 A | 9/1979 | Inoyama et al. | 235/379 |
| 4,179,685 A | 12/1979 | O'Maley | 340/146.3 H |
| 4,187,463 A | 2/1980 | Kivenson | 324/228 |
| 4,205,780 A | 6/1980 | Burns et al. | 235/454 |
| 4,231,014 A | 10/1980 | Ponzio | 340/146.3 Y |
| 4,237,378 A | 12/1980 | Jones | 250/223 R |
| 4,250,806 A | 2/1981 | Boyson et al. | 101/2 |
| 4,255,651 A | 3/1981 | Phillips | 235/92 |
| 4,264,808 A | 4/1981 | Owens et al. | 235/379 |
| 4,275,874 A | 6/1981 | DiBlasio | 271/4 |
| 4,277,774 A | 7/1981 | Fujii et al. | 340/146.3 |
| 4,283,708 A | 8/1981 | Lee | 340/146.3 Z |
| 4,288,781 A | 9/1981 | Sellner et al. | 340/146.3 |
| 4,302,781 A | 11/1981 | Ikeda et al. | 358/486 |
| 4,310,885 A | 1/1982 | Azcua et al. | 364/405 |
| 4,311,914 A | 1/1982 | Huber | 250/556 |
| 4,313,598 A | 2/1982 | DiBlasio | 271/124 |
| 4,321,672 A | 3/1982 | Braun et al. | 364/408 |
| 4,334,619 A | 6/1982 | Horino et al. | 209/551 |
| 4,337,864 A | 7/1982 | McLean | 209/534 |
| 4,348,656 A | 9/1982 | Gorgone et al. | 340/146.3 R |
| 4,349,111 A | 9/1982 | Shah et al. | 209/534 |
| 4,352,988 A | 10/1982 | Ishida | 250/559 |
| 4,355,300 A | 10/1982 | Weber | 340/146.3 C |
| 4,355,369 A | 10/1982 | Garvin | 364/900 |
| 4,356,473 A | 10/1982 | Freudenthal | 340/146.3 H |
| 4,360,034 A | 11/1982 | Davila et al. | 133/3 |
| 4,381,447 A | 4/1983 | Horvath et al. | 250/223 |
| 4,383,540 A | 5/1983 | DeMeyer et al. | 133/3 H |
| 4,386,432 A | 5/1983 | Nakamura et al. | 382/7 |
| 4,396,902 A | 8/1983 | Warthan et al. | 382/64 |
| 4,416,299 A | 11/1983 | Bergman | 133/1 R |
| 4,420,153 A | 12/1983 | Winkler et al. | 271/304 |
| 4,441,205 A | 4/1984 | Berkin et al. | 382/8 |
| 4,442,541 A | 4/1984 | Finkel et al. | 382/7 |
| 4,449,240 A | 5/1984 | Yoshida | 382/15 |
| 4,461,028 A | 7/1984 | Okubo | 382/15 |
| 4,464,786 A | 8/1984 | Nishito et al. | 382/7 |
| 4,464,787 A | 8/1984 | Fish et al. | 382/7 |
| RE31,692 E | 10/1984 | Tyburski et al. | 382/7 |
| 4,480,177 A | 10/1984 | Allen | 235/379 |
| 4,487,306 A | 12/1984 | Nao et al. | 194/4 |
| 4,490,846 A | 12/1984 | Ishida et al. | 382/7 |
| 4,513,439 A | 4/1985 | Gorgone et al. | 382/7 |
| 4,530,067 A | 7/1985 | Dorr | 364/900 |
| 4,538,719 A | 9/1985 | Gray et al. | 194/100 A |
| 4,539,702 A | 9/1985 | Oka | 382/7 |
| 4,542,829 A | 9/1985 | Emery et al. | 209/534 |
| 4,543,969 A | 10/1985 | Rasmussen | 133/3 |
| 4,544,266 A | 10/1985 | Antes | 356/71 |
| 4,547,896 A | 10/1985 | Ohtombe et al. | 382/7 |
| 4,553,222 A | 11/1985 | Kurland et al. | 364/900 |
| 4,553,846 A | 11/1985 | Hilton et al. | 356/429 |
| 4,556,140 A | 12/1985 | Okada | 194/4 |
| 4,558,224 A | 12/1985 | Gober | 250/460.1 |
| 4,559,451 A | 12/1985 | Curl | 250/560 |
| 4,563,771 A | 1/1986 | Gorgone et al. | 382/7 |
| 4,567,370 A | 1/1986 | Falls | 250/461.1 |
| 4,569,421 A | 2/1986 | Sandstedt | 186/39 |
| 4,582,172 A | 4/1986 | Takeuchi et al. | 186/38 |
| 4,584,529 A | 4/1986 | Aoyama | 324/261 |
| 4,587,412 A | 5/1986 | Apisdorf | 235/449 |
| 4,587,434 A | 5/1986 | Roes et al. | 250/556 |
| 4,590,606 A | 5/1986 | Rohrer | 382/7 |
| 4,592,090 A | 5/1986 | Curl et al. | 382/7 |
| 4,593,184 A | 6/1986 | Bryce | 235/449 |
| 4,594,644 A | 6/1986 | Hashimoto | 364/405 |
| 4,602,332 A | 7/1986 | Hirose et al. | 364/408 |
| 4,605,926 A | 8/1986 | Onishi et al. | 340/825.3 |
| 4,611,345 A | 9/1986 | Ohnishi et al. | 382/7 |
| 4,617,458 A | 10/1986 | Bryce | 235/449 |
| 4,628,194 A | 12/1986 | Dobbins et al. | 235/379 |
| 4,645,936 A | 2/1987 | Gorgone | 250/556 |
| 4,653,647 A | 3/1987 | Hashimoto | 209/534 |
| 4,658,289 A | 4/1987 | Nagano et al. | 358/75 |
| 4,676,343 A | 6/1987 | Humble et al. | 186/61 |
| 4,677,682 A | 6/1987 | Miyagawa et al. | 382/7 |
| 4,678,072 A | 7/1987 | Kobayashi et al. | 194/206 |
| 4,685,141 A | 8/1987 | Hoque et al. | 382/7 |
| 4,686,357 A | 8/1987 | Douno et al. | 235/379 |
| 4,694,963 A | 9/1987 | Takesako | 209/534 |
| 4,697,071 A | 9/1987 | Hiraoka et al. | 235/379 |
| 4,700,368 A | 10/1987 | Munn et al. | 377/8 |
| 4,716,456 A | 12/1987 | Hosaka | 358/75 |
| 4,733,308 A | 3/1988 | Nakamura et al. | 358/496 |
| 4,735,289 A | 4/1988 | Kenyon | 186/37 |
| 4,743,743 A | 5/1988 | Fukatsu | 235/379 |
| 4,743,974 A | 5/1988 | Lockwood | 358/285 |
| 4,748,679 A | 5/1988 | Gold et al. | 382/61 |
| 4,749,087 A | 6/1988 | Buttifant | 209/534 |
| 4,753,625 A | 6/1988 | Okada | 453/32 |
| 4,764,725 A | 8/1988 | Bryce | 324/234 |
| 4,764,976 A | 8/1988 | Kallin et al. | 382/65 |
| 4,782,328 A | 11/1988 | Denlinger | 340/365 |
| 4,784,274 A | 11/1988 | Mori et al. | 209/534 |
| 4,803,347 A | 2/1989 | Sugahara et al. | 235/379 |
| 4,806,709 A | 2/1989 | Evans | 178/19 |
| 4,811,004 A | 3/1989 | Person et al. | 340/712 |
| 4,817,176 A | 3/1989 | Marshall et al. | 382/43 |
| 4,821,332 A | 4/1989 | Durham | 382/7 |
| 4,823,393 A | 4/1989 | Kawakami | 382/7 |
| 4,825,246 A | 4/1989 | Fukuchi et al. | 355/4 |
| 4,827,531 A | 5/1989 | Milford | 382/7 |
| 4,837,842 A | 6/1989 | Holt | 382/26 |
| 4,841,358 A | 6/1989 | Kammoto et al. | 358/75 |
| 4,851,616 A | 7/1989 | Wales et al. | 178/18 |
| 4,877,230 A | 10/1989 | Winkler et al. | 271/3 |
| 4,880,096 A | 11/1989 | Kobayashi et al. | 194/206 |
| 4,881,268 A | 11/1989 | Uchida et al. | 382/7 |
| 4,883,181 A | 11/1989 | Yoshikawa | 209/534 |
| 4,888,812 A | 12/1989 | Dinan et al. | 382/7 |
| 4,903,953 A | 2/1990 | Winkler et al. | 271/4 |
| 4,905,839 A | 3/1990 | Yuge et al. | 209/534 |
| 4,905,840 A | 3/1990 | Yuge et al. | 209/534 |
| 4,908,516 A | 3/1990 | West | 250/556 |
| 4,922,109 A | 5/1990 | Bercovitz et al. | 194/207 |
| 4,928,094 A | 5/1990 | Smith | 340/712 |
| 4,931,782 A | 6/1990 | Jackson | 340/706 |
| 4,947,441 A | 8/1990 | Hara et al. | 382/7 |
| 4,954,697 A | 9/1990 | Kokubun et al. | 235/381 |
| 4,960,981 A | 10/1990 | Benton et al. | |
| 4,970,655 A | 11/1990 | Winn et al. | 364/479 |
| 4,973,851 A | 11/1990 | Lee | 250/556 |
| 4,980,543 A | 12/1990 | Hara et al. | 209/534 |
| 4,992,860 A | 2/1991 | Hamaguchi et al. | 358/75 |
| 4,996,604 A | 2/1991 | Ogawa et al. | 358/486 |
| 5,023,782 A | 6/1991 | Lutz et al. | 364/405 |
| 5,027,415 A | 6/1991 | Hara et al. | 382/7 |
| 5,047,871 A | 9/1991 | Meyer et al. | 358/486 |
| 5,054,621 A | 10/1991 | Murphy et al. | 209/534 |
| 5,055,834 A | 10/1991 | Chiba | 340/825 |
| 5,063,599 A | 11/1991 | Concannon et al. | 382/7 |

| Patent | Date | Inventor | Class |
|---|---|---|---|
| 5,068,519 A | 11/1991 | Bryce | 235/449 |
| 5,076,441 A | 12/1991 | Gerlier | 209/534 |
| 5,091,961 A | 2/1992 | Baus, Jr. | 382/7 |
| 5,105,601 A | 4/1992 | Horiguchi et al. | 53/465 |
| 5,114,381 A | 5/1992 | Ueda et al. | 453/57 |
| 5,120,944 A | 6/1992 | Kern et al. | 235/379 |
| 5,122,754 A | 6/1992 | Gotaas | 324/676 |
| 5,134,663 A | 7/1992 | Kozlowski | 382/7 |
| 5,135,115 A | 8/1992 | Miller et al. | 209/564 |
| 5,144,115 A | 9/1992 | Yoshida | 235/379 |
| 5,146,512 A | 9/1992 | Weideman et al. | 382/30 |
| 5,151,607 A | 9/1992 | Crane | 250/556 |
| 5,154,272 A | 10/1992 | Nishiumi et al. | 194/318 |
| 5,159,548 A | 10/1992 | Caslavka | 364/408 |
| 5,163,672 A | 11/1992 | Mennie | 271/187 |
| 5,163,868 A | 11/1992 | Adams et al. | 453/11 |
| 5,167,313 A | 12/1992 | Dobbins et al. | 194/317 |
| 5,175,682 A * | 12/1992 | Higashiyama et al. | 705/45 |
| 5,183,142 A | 2/1993 | Latchinian et al. | 194/206 |
| 5,184,115 A | 2/1993 | Black et al. | 340/708 |
| 5,184,709 A | 2/1993 | Nishiumi et al. | 194/318 |
| 5,186,334 A | 2/1993 | Fukudome et al. | 209/534 |
| 5,187,750 A | 2/1993 | Behera | 382/7 |
| 5,193,121 A | 3/1993 | Elischer et al. | 382/7 |
| 5,198,976 A | 3/1993 | Form et al. | 364/410 |
| 5,199,543 A | 4/1993 | Kamagami et al. | 194/207 |
| 5,201,395 A | 4/1993 | Takizawa et al. | 194/206 |
| 5,207,788 A | 5/1993 | Geib et al. | 271/122 |
| 5,231,381 A | 7/1993 | Duwaer | 340/712 |
| 5,237,158 A | 8/1993 | Kern et al. | 235/379 |
| 5,239,593 A | 8/1993 | Wittner et al. | 382/14 |
| 5,251,738 A | 10/1993 | Dabrowski | 194/206 |
| 5,261,518 A | 11/1993 | Bryce | 194/206 |
| 5,265,008 A | 11/1993 | Benton et al. | 364/408 |
| 5,279,403 A | 1/1994 | Harbaugh et al. | 194/207 |
| 5,286,954 A | 2/1994 | Sato et al. | 235/379 |
| 5,295,196 A | 3/1994 | Raterman et al. | 382/135 |
| 5,297,030 A | 3/1994 | Vassigh et al. | 364/405 |
| 5,299,977 A | 4/1994 | Mazur et al. | 453/10 |
| 5,304,813 A | 4/1994 | DeMan | 250/556 |
| 5,308,992 A | 5/1994 | Crane et al. | 250/556 |
| 5,309,515 A | 5/1994 | Troung et al. | 382/7 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,341,408 A | 8/1994 | Melcher et al. | 377/8 |
| 5,342,165 A | 8/1994 | Graef et al. | 414/788.9 |
| 5,363,949 A | 11/1994 | Matsubayashi | 194/206 |
| 5,367,577 A | 11/1994 | Gotaas | 382/7 |
| 5,368,147 A | 11/1994 | Menke et al. | 194/206 |
| 5,371,345 A | 12/1994 | LeStrange et al. | 235/380 |
| 5,371,798 A | 12/1994 | McWhortor | 380/51 |
| 5,373,550 A | 12/1994 | Campbell et al. | 379/100 |
| 5,379,344 A | 1/1995 | Larson et al. | 380/23 |
| 5,381,019 A | 1/1995 | Sato | 250/556 |
| 5,394,969 A | 3/1995 | Harbaugh | 194/206 |
| 5,399,874 A | 3/1995 | Gonsalves et al. | 250/556 |
| 5,402,895 A | 4/1995 | Mikkelsen et al. | 209/534 |
| 5,417,316 A | 5/1995 | Harbaugh | 194/206 |
| 5,418,458 A | 5/1995 | Jeffers | 324/235 |
| 5,419,424 A | 5/1995 | Harbaugh | 194/206 |
| 5,421,443 A | 6/1995 | Hatamachie et al. | 914/206 |
| 5,430,664 A | 7/1995 | Cargill et al. | 364/550 |
| 5,434,427 A | 7/1995 | Crane et al. | 250/556 |
| 5,437,357 A | 8/1995 | Ota et al. | 194/206 |
| 5,438,184 A | 8/1995 | Roberts et al. | 235/380 |
| 5,444,043 A | 8/1995 | Fenical et al. | 514/9 |
| 5,444,793 A | 8/1995 | Kelland | 382/138 |
| 5,444,794 A | 8/1995 | Uhland, Sr. | 382/137 |
| 5,459,304 A | 10/1995 | Eisenmann | 235/380 |
| 5,465,301 A | 11/1995 | Jotcham et al. | 380/54 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,468,941 A | 11/1995 | Sasaki | 235/379 |
| 5,476,169 A | 12/1995 | Takarada et al. | 194/207 |
| 5,481,377 A | 1/1996 | Udagawa et al. | 358/501 |
| 5,488,671 A | 1/1996 | Kern | 382/138 |
| 5,504,822 A | 4/1996 | Holt | 382/218 |
| 5,506,691 A | 4/1996 | Bednar et al. | 358/402 |
| D369,984 S | 5/1996 | Larsen | D10/97 |
| 5,523,575 A | 6/1996 | Machida et al. | 250/208.1 |
| 5,530,772 A | 6/1996 | Storey | 382/135 |
| 5,537,486 A | 7/1996 | Stratigos et al. | 382/137 |
| 5,544,043 A | 8/1996 | Miki et al. | 364/406 |
| 5,545,885 A | 8/1996 | Jagielinski | 235/449 |
| 5,564,546 A | 10/1996 | Molbak et al. | 194/216 |
| 5,586,036 A | 12/1996 | Pintsov | 364/464 |
| 5,592,377 A | 1/1997 | Lipkin | 395/242 |
| 5,600,732 A | 2/1997 | Ott et al. | 382/112 |
| 5,602,933 A | 2/1997 | Blackwell et al. | 382/116 |
| 5,602,936 A | 2/1997 | Green et al. | 382/140 |
| 5,607,040 A | 3/1997 | Mathurin, Sr. | 194/207 |
| 5,615,280 A | 3/1997 | Izawa et al. | 382/135 |
| 5,620,079 A | 4/1997 | Molbak | 194/217 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |
| 5,657,846 A | 8/1997 | Schwartz | 194/206 |
| 5,678,046 A | 10/1997 | Cahill et al. | 395/616 |
| 5,680,472 A | 10/1997 | Conant | 382/135 |
| 5,687,963 A | 11/1997 | Mennie | 271/119 |
| 5,692,067 A | 11/1997 | Raterman et al. | 382/135 |
| 5,704,491 A | 1/1998 | Graves | 209/534 |
| 5,719,948 A | 2/1998 | Liang | 382/112 |
| 5,724,438 A | 3/1998 | Graves | 382/135 |
| 5,727,667 A | 3/1998 | Nye | 194/207 |
| 5,729,623 A | 3/1998 | Omatu et al. | 382/155 |
| 5,751,840 A | 5/1998 | Raterman et al. | 382/135 |
| 5,751,842 A | 5/1998 | Riach et al. | 382/137 |
| 5,754,673 A | 5/1998 | Brooks et al. | 382/112 |
| 5,761,089 A | 6/1998 | Mcinerny | 364/550 |
| 5,781,654 A | 7/1998 | Carney | 382/137 |
| 5,790,693 A | 8/1998 | Graves et al. | 382/135 |
| 5,790,697 A | 8/1998 | Munro et al. | 382/135 |
| 5,799,767 A | 9/1998 | Molbak | 194/217 |
| 5,806,650 A | 9/1998 | Mennie et al. | 194/206 |
| 5,815,592 A | 9/1998 | Mennie et al. | 382/135 |
| 5,822,448 A | 10/1998 | Graves et al. | 382/135 |
| 5,830,054 A | 11/1998 | Petri | 453/5 |
| 5,832,104 A | 11/1998 | Graves et al. | 382/135 |
| 5,832,463 A * | 11/1998 | Funk | 705/35 |
| 5,852,811 A | 12/1998 | Atkins | 705/36 |
| 5,867,589 A | 2/1999 | Graves et al. | 382/135 |
| 5,870,487 A | 2/1999 | Graves et al. | 382/135 |
| 5,875,259 A | 2/1999 | Mennie et al. | 382/135 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,918,748 A | 7/1999 | Clark et al. | 209/534 |
| 5,926,550 A | 7/1999 | Davis | 380/25 |
| 5,938,044 A | 8/1999 | Weggesser | 209/534 |
| 5,940,623 A | 8/1999 | Watts et al. | 395/712 |
| 5,940,844 A * | 8/1999 | Cahill et al. | 715/526 |
| 5,943,655 A | 8/1999 | Jacobsen | 705/30 |
| 5,947,255 A | 9/1999 | Shimada et al. | 194/207 |
| 5,960,103 A | 9/1999 | Graves et al. | 382/135 |
| 5,966,456 A | 10/1999 | Jones et al. | 382/135 |
| 5,982,918 A | 11/1999 | Mennie et al. | 382/135 |
| 5,992,601 A | 11/1999 | Mennie et al. | 194/207 |
| 6,012,565 A | 1/2000 | Mazur | 194/207 |
| 6,021,883 A | 2/2000 | Casanova et al. | 194/217 |
| 6,023,684 A | 2/2000 | Pearson | 705/35 |
| 6,026,175 A | 2/2000 | Raterman et al. | 382/135 |
| 6,028,951 A | 2/2000 | Raterman et al. | 382/135 |

| | | | | | | |
|---|---|---|---|---|---|---|
| 6,038,553 | A * | 3/2000 | Hyde, Jr. .................... 705/45 | EP | 0 718 809 A2 | 6/1996 |
| 6,039,645 | A | 3/2000 | Mazur ........................ 453/10 | EP | 0 612 042 B1 | 6/1998 |
| 6,068,174 | A | 5/2000 | Mazur ........................ 235/492 | EP | 0 548 142 B2 | 9/1999 |
| 6,072,896 | A | 6/2000 | Graves et al. ............... 382/135 | EP | 0 708 419 B1 | 1/2000 |
| 6,073,744 | A | 6/2000 | Raterman et al. ........... 194/207 | EP | 0 824 736 B1 | 3/2000 |
| 6,074,334 | A | 6/2000 | Mennie et al. .............. 493/438 | EP | 0 686 292 B1 | 7/2000 |
| D427,623 | S | 7/2000 | Kuwada et al. ............... D18/3 | EP | 0 760 987 B1 | 9/2000 |
| 6,128,402 | A | 10/2000 | Jones et al. .................. 382/135 | GB | 2 038 063 | 7/1980 |
| 6,193,152 | B1 * | 2/2001 | Fernando et al. ........... 235/380 | GB | 2 190 996 | 12/1987 |
| 6,220,419 | B1 | 4/2001 | Mennie ...................... 194/207 | GB | 2 204 166 | 11/1988 |
| 6,237,739 | B1 | 5/2001 | Mazur et al. ............... 194/207 | GB | 2 272 762 | 5/1994 |
| 6,241,069 | B1 | 6/2001 | Mazur et al. ............... 194/207 | JP | 62-220843 | 9/1987 |
| 6,243,689 | B1 * | 6/2001 | Norton ........................ 705/18 | JP | 2-12492 | 1/1990 |
| 6,247,645 | B1 * | 6/2001 | Harris et al. ................ 235/454 | WO | WO 90/07165 | 6/1990 |
| 6,256,407 | B1 | 7/2001 | Mennie et al. .............. 382/135 | WO | WO 91/11778 | 8/1991 |
| 6,278,795 | B1 | 8/2001 | Anderson et al. ........... 382/135 | WO | WO 92/14221 | 8/1992 |
| 6,283,366 | B1 * | 9/2001 | Hills et al. ................... 235/379 | WO | WO 92/17394 | 10/1992 |
| 6,311,819 | B1 | 11/2001 | Stromme et al. ........... 194/207 | WO | WO 93/23824 | 11/1993 |
| 6,318,537 | B1 | 11/2001 | Jones et al. .................. 914/346 | WO | WO 94/16412 | 7/1994 |
| 6,351,551 | B1 | 2/2002 | Munro et al. ............... 382/135 | WO | WO 94/19773 | 9/1994 |
| 6,354,491 | B1 * | 3/2002 | Nichols et al. .............. 235/379 | WO | WO 95/24691 | 3/1995 |
| 6,363,164 | B1 | 3/2002 | Jones et al. .................. 382/135 | WO | WO 95/19019 | 7/1995 |
| 6,371,303 | B1 | 4/2002 | Klein et al. .................. 209/534 | WO | WO 96/10800 | 9/1995 |
| 6,378,683 | B1 | 4/2002 | Mennie ...................... 194/207 | WO | WO 96/36933 | 11/1996 |
| 6,381,354 | B1 | 4/2002 | Mennie et al. .............. 382/135 | WO | WO 97/29459 | 8/1997 |
| 6,398,000 | B1 | 6/2002 | Jenrick et al. ............... 194/200 | WO | WO 97/30422 | 8/1997 |
| 6,459,806 | B1 | 10/2002 | Raterman et al. ........... 382/135 | WO | WO 98/24041 | 6/1998 |
| 6,460,705 | B1 | 10/2002 | Hallowell .................... 209/534 | WO | WO 98/48383 | 10/1998 |
| 6,473,519 | B1 * | 10/2002 | Pidhirny et al. ............. 382/140 | WO | WO 98/48384 | 10/1998 |
| 6,547,132 | B1 * | 4/2003 | Templeton et al. ......... 235/380 | WO | WO 98/48385 | 10/1998 |
| 2001/0019624 | A1 | 9/2001 | Raterman et al. ........... 382/135 | WO | WO 98/51082 | 11/1998 |
| 2002/0001393 | A1 | 1/2002 | Jones et al. .................. 382/100 | WO | WO 99/00776 | 1/1999 |
| 2002/0020603 | A1 | 2/2002 | Jones et al. .................. 194/346 | | | |
| 2002/0056605 | A1 | 5/2002 | Mazur et al. ............... 194/207 | | | |
| 2002/0085245 | A1 | 7/2002 | Mennie et al. .............. 358/498 | | | |
| 2002/0103757 | A1 | 8/2002 | Jones et al. .................. 705/45 | | | |
| 2002/0104785 | A1 | 8/2002 | Klein et al. .................. 209/534 | | | |
| 2002/0107801 | A1 | 8/2002 | Jones et al. .................. 705/45 | | | |
| 2002/0118871 | A1 | 8/2002 | Jones et al. .................. 382/137 | | | |
| 2002/0122580 | A1 | 9/2002 | Jones et al. .................. 382/137 | | | |
| 2002/0126885 | A1 | 9/2002 | Mennie et al. .............. 382/135 | | | |
| 2002/0126886 | A1 | 9/2002 | Jones et al. .................. 382/135 | | | |
| 2002/0131630 | A1 | 9/2002 | Jones et al. .................. 382/137 | | | |
| 2002/0136442 | A1 | 9/2002 | Jones et al. .................. 382/135 | | | |
| 2002/0145035 | A1 | 10/2002 | Jones ........................... 235/379 | | | |
| 2002/0154804 | A1 | 10/2002 | Jones et al. .................. 382/135 | | | |
| 2002/0154805 | A1 | 10/2002 | Jones et al. .................. 382/135 | | | |
| 2002/0154806 | A1 | 10/2002 | Jones et al. .................. 382/135 | | | |
| 2002/0154807 | A1 | 10/2002 | Jones et al. .................. 382/135 | | | |
| 2002/0154808 | A1 | 10/2002 | Jones et al. .................. 382/135 | | | |
| 2002/0166891 | A1 * | 11/2002 | Stoutenburg et al. ....... 235/379 | | | |
| 2002/0186876 | A1 | 12/2002 | Jones et al. .................. 382/135 | | | |

FOREIGN PATENT DOCUMENTS

| | | |
|---|---|---|
| EP | 0 077 464 | 4/1983 |
| EP | 0 083 062 | 7/1983 |
| EP | 0 101 115 | 2/1984 |
| EP | 0 109 743 | 5/1984 |
| EP | 0 185 200 | 6/1986 |
| EP | 0 253 935 | 1/1988 |
| EP | 0 325 364 | 7/1989 |
| EP | 0 338 123 | 10/1989 |
| EP | 0 342 647 | 11/1989 |
| EP | 0 402 627 | 12/1990 |
| EP | 0 578 875 | 1/1994 |
| EP | 0 583 526 | 2/1994 |
| EP | 0 583 723 | 2/1994 |
| EP | 0 612 042 A3 | 8/1994 |
| EP | 0 613 107 | 8/1994 |
| EP | 0 633 552 | 1/1995 |
| EP | 0 633 553 | 2/1995 |
| EP | 0 671 696 | 9/1995 |

OTHER PUBLICATIONS

Barton, Louis L., "Check Processing Operations," Chapter 8 and Appendix 2, pp. 119-140 and 225-231 (1994).

Brandt, Mach 7 High-Speed Coin Sorter/Counter, 2 pages (Apr. 1, 1993).

Brandt, Model 8904 Upfeed, High Speed 4-Denomination Currency Dispenser, 2 pages (date prior to May 1996).

Cash Depositing System CDS 5700 and CDS 5800 (Jan. 3, 1995).

Cash Receipt System CRS/6501/CRS6510, IREIS (Feb. 1995).

Cassius Elston, "No More Lines . . . Self Serve Cash-Out," Drop Stream Developments, pp. 3-4(date prior to May 13, 1996).

Contomat (date prior to May 13, 1996).

Cummins-Allison Corp., Operating Instructions for JetScan Currency Scanner/Counter, Model 4061 (Apr. 20, 1993).

Cummins-Allison Corp., Operating Instructions for JetScan Currency Scanner/Counter, Model 4062 (Nov. 28, 1994).

Cummins-Allison Corp., Operating Instructions for JetSort® High Speed Sorter/Counter (Kits I & J), 11 pages (1993).

Cummins-Allison Corp., Operator's Manual for JetScan Currency Scanner/Counter, Model 4060 (Aug. 1991).

Cummins-Allison Corp., Sale of JetScan Currency Scanner/Counter, Model 4060 (Aug. 1991).

Cummins-Allison Corp., Sale of JetScan Currency Scanner/Counter, Model 4061 (Apr. 20, 1993).

Cummins-Allison Corp., Sale of JetScan Currency Scanner/Counter, Model 4062 (Nov. 28, 1994).

Currency Systems International, CPS 600 and CPS 900 (estimated 1994).

Currency Systems International, Medium Speed Currency Sorting Family, CPS 600 and CPS 900, 4 pages (1994).

Currency Systems International, Mr. W. Kranister in

Conversation With Richard Haycock, pp. 1-5 (estimated 1994).
Currency Systems International/Currency Processing Systems, CPS 300, 4 pages (1992).
De La Rue Garny GmBH, Cash Depositing Systems CDS 5700 and CDS 5800 (date unknown, with translation).
Glory, General Catalog of Products, System 8000 at p. 5 (1996, with translation).
Glory, GFB-200/210/220/230, Desk-Top Bank Note Counter, 2 pages (estimated date prior to Aug. 9, 1994).
Glory, GSA-500 Sortmaster, 2 pages (Jan. 14, 1994).
Glory, The New CRS-8000 Cash Redemption System (date prior to May 13, 1996).
Glory, UF-1D, 2 pages (estimated date prior to Aug. 9, 1994).
ISH I2005/500 SB-Münzähler (date prior to May 13, 1996, with translation).
Mosler, Inc., "The Mosler/Toshiba CF-420" (1989).
NGZ 2100 (date prior to May 13, 1996).
PREMA 405(RE) Self Service Coin Deposit Facility (date prior to May 13, 1996).
Scan Coin CDS 600 Cash Deposit System (Jun. 15, 1994).
Scan Coin CDS 640 Cash Deposit System (Jun. 15, 1994).
Toshiba-Mosler, CF-420 (estimated 1989).
Toshiba-Mosler, Operator's Manual for CF-420 Cash Settlement System, pp. 1-C-3 (1989).
Toshiba-Mosler, revised drawings of portions of CF-420 Cash Management System (FIGS. A-C) and description of same (1989).
Vector Videotape (no date).
Translation of EP 0077464.
Translation of EP 0342647.
Translation of JP 62-220843.
Translation of JP 2-12492.

* cited by examiner

REMOTE AUTOMATED DOCUMENT PROCESSING SYSTEM

FIELD OF THE INVENTION

The present invention relates to document processing systems such as automatic teller machines and currency redemption machines.

SUMMARY OF THE INVENTION

An object of some embodiments of the present invention is to provide a document processing system capable of processing documents utilizing full image scanning.

A further object of some embodiments of the present invention is to provide a document processing system which obtains approval for payment of documents, such as checks, through the ACH system.

Another object of some embodiments of the present invention is to provide a document processing system where information obtained from the documents is stored in an image file.

Another object of some embodiments of the present invention is to provide a document processing system capable of processing all types of documents and interfacing with all types of outside accounting systems.

Another object of some embodiments of the present invention is to provide a document processing system which obtains information by performing full image scanning of documents and utilizes this information to determine additional information concerning the documents, such as the value of a document.

A further object of some embodiments of the present invention is to provide a document processing system whereby the full image of the scanned document can be communicated to a central office.

Other aspects and advantages of the present invention will become apparent upon reading the following detailed description and with reference to the drawings.

In accordance with an embodiment of the present invention, the foregoing objectives are realized by providing an automated check processing system having document scanners for accepting and processing checks from a customer. The document scanners are adapted to obtain full images of checks fed into the document scanners and obtain images of selected portions of the documents. That is, according to some embodiments, the scanners are adapted to obtain the entire image or substantially the entire image of each scanned document. A printer prints an authorization agreement on the checks and can also inscribe the transaction amount on the check. Also included is a conveyor for returning the checks with the agreement to the customer. The information scanned is communicated to a central clearinghouse via a communication link.

According to another embodiment, an automated point-of-sale check processing system for processing customer transactions includes a document scanner located at a site of a customer transaction. The document scanner has a slot adapted to accept a document. After having obtained an authorization agreement from a customer, the scanner obtains at least one image of the document. A communication link is coupled to a central clearinghouse and adapted to communicate information represented by at least one image to the central clearinghouse for processing the document.

BRIEF DESCRIPTION OF THE DRAWINGS

The foregoing and other advantages of the invention will become apparent upon reading the following detailed description and upon reference to the drawings.

Figure 1:
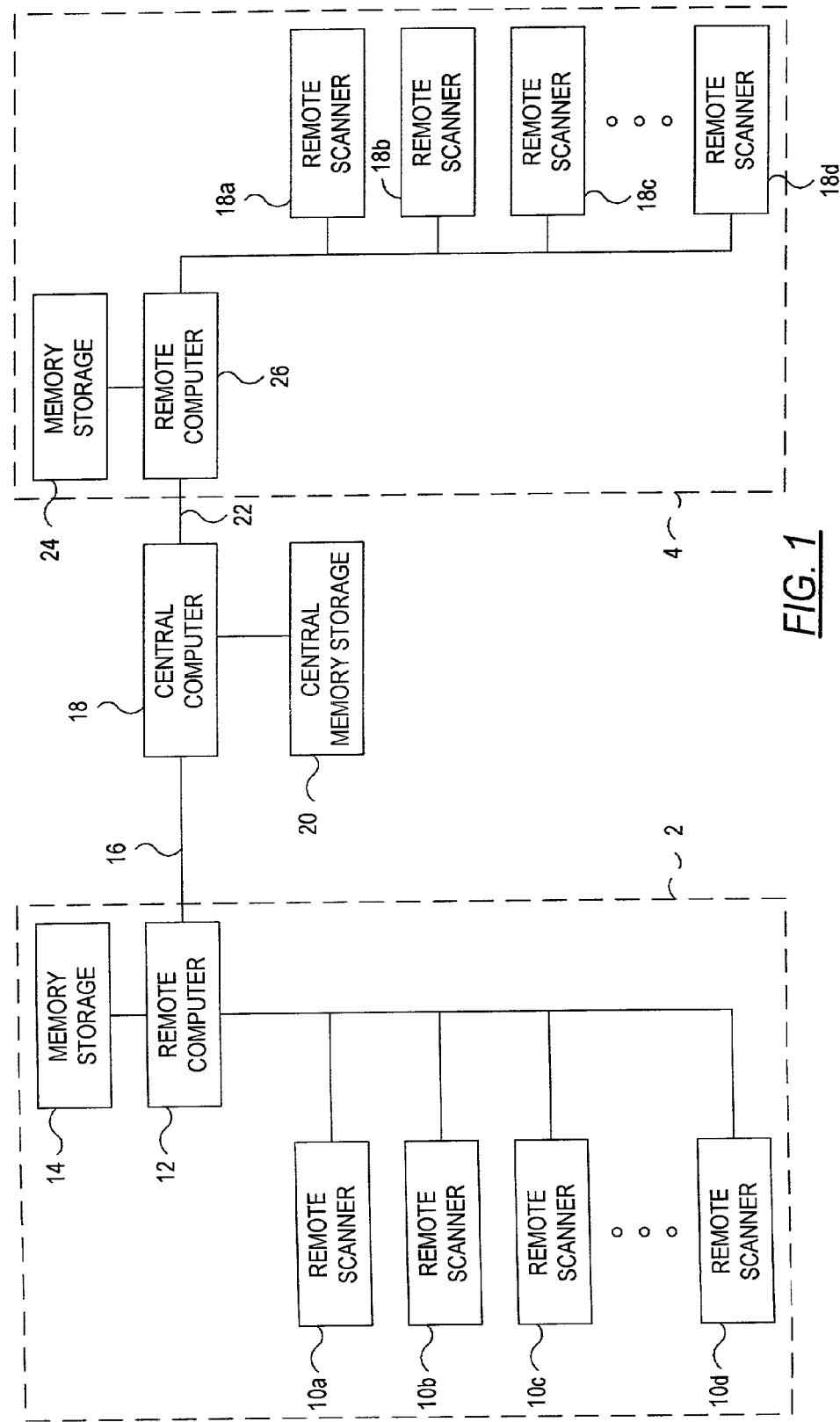
FIG. 1 is a block diagram of the components of a scanning system according to principles of an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Referring now to FIG. 1, the operation of the scanning system is now described. A plurality of remote scanners 10a, 10b, 10c, 10d are linked to a remote computer 12. In this application, use of the adjective "remote" means that the item (scanner, computer, etc.) is at a location separate from the central processing center. The purpose of the scanners, as will be described in greater detail later, is to obtain images from documents, process these images, and return the scanned documents to customers. The document is typically a check. It is contemplated, however, that other types of documents could be processed, such as coupon and loan payment documents, food stamps, cash tickets, savings withdrawal tickets, check deposit slips, savings deposit slips, and all other documents utilized as proof of deposit at a financial institution. Documents scanned and processed could also include currency such as bank notes and casino script. By "financial institution," it is meant to include savings and loans, investment houses, and all other types of financial institutions whether private, public, or government. The following description is in terms of banks, but also includes all other types of financial institutions. Also, the term "documents" includes loan applications, credit card applications, student loan applications, accounting invoices, debit forms, account transfer forms, and all other types of forms with predetermined fields.

The remote scanners 10a, 10b, 10c, 10d may be located together at a location 2, such as a retail store. For example, a single remote scanner may be located in each check-out location of a department store.

According to one embodiment, the remote computer 12 is responsible for providing any additional processing required of the images or image files transmitted from remote scanners 10a, 10b, 10c, 10d. For example, one function provided by the remote computer 12 is to store the images or image files in a memory storage 14. The image files are stored in the memory storage 14 using techniques that are well-known in the art. For example, images may be stored in .tif or bitmap formats. The remote computer 12 may be a personal computer or other computer system as is known in the art, such as either a more or a less sophisticated computer system. The memory storage 14 may be of any type known in the art, such as magnetic storage, optical storage, or other types of memory. The remote computer 12 may also contain memory storage that may be used in conjunction with or as an alternative to the memory storage 14.

The remote computer 12 is coupled to a central computer 18 via a communication link 16. The communication link 16 may be any link used for data, voice, or video communications that is known in the art, such as a telephone line. Alternatively, the communication link 16 may be over another form of media, such as a radio or microwave link. The function of the central computer 18 is to provide further processing of the image files or images provided over the communication link 16. This processing can include sorting data or extracting further information from the images or image files transmitted over the communication link 16. The central computer stores the images or image files in a central memory storage which can be any type of common storage device.

Remote scanners 18a, 18b, 18c, 18d are all coupled to a remote computer 26. The remote scanners 18a, 18b, 18c, 18d are at a location 4 different from remote scanners 10a, 10b, 10c, 10d, for example, at another retail location. The remote computer 26 stores images or image files obtained from remote scanners 18a, 18b, 18c, 18d in memory storage 24. The remote computer 26 is coupled to the central computer 18 via a communication link 22, such as the type described in connection with the communication link 16. Although not shown, other scanner networks can be connected to the central computer in network arrangements as are known in the art. For example, various network architectures can be used to connect the scanner arrangements at a particular site and to connect particular sites together.

Figure 2:
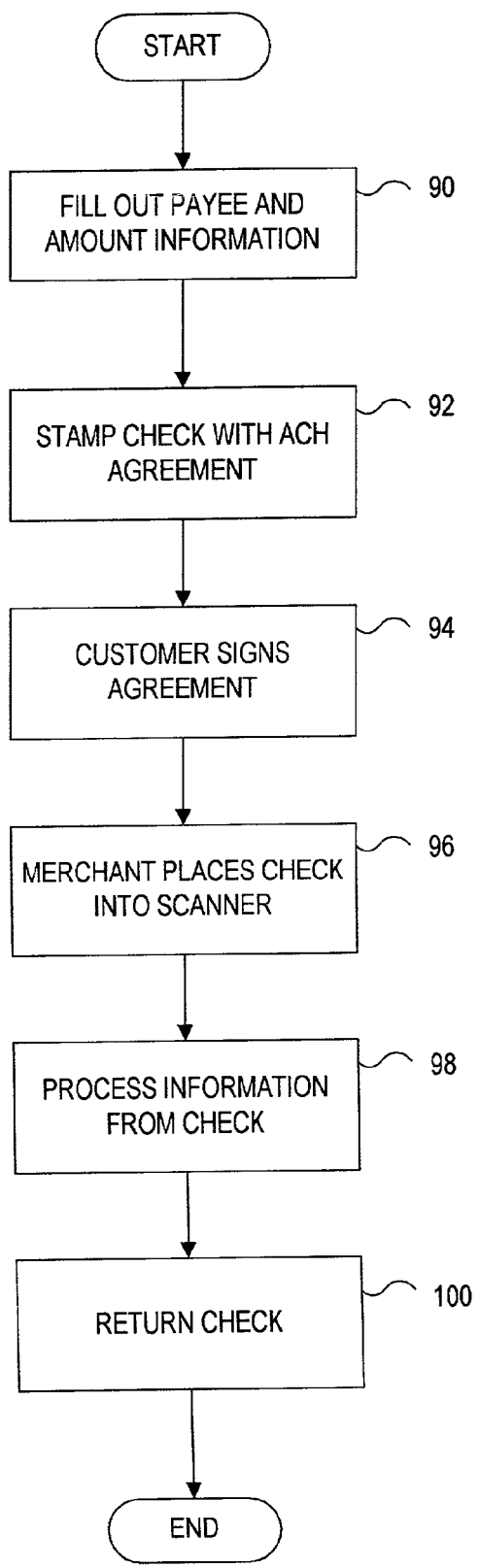
FIG. 2 is a flowchart describing the operation of a scanning system according to principles of an embodiment of the present invention.

Referring now to FIG. 2, the operation of a scanning system according to one embodiment is now described. In some embodiments, the scanning system may be a point-of-sale check processing system. At step 90, a customer fills out the amount and payee information on a document, such as a check. At step 92, the document, for example, the check, is stamped with an Automated Clearing House ("ACH") agreement. The ACH agreement may be printed on the document by the scanning system as described below in reference to FIG. 3. Alternatively, it is also contemplated that the ACH agreement may be stamped automatically or manually onto the document. It is also contemplated that a separate document, such as a receipt, may be stamped with the ACH agreement or has the ACH agreement printed on it. This process would be similar to issuing a credit card receipt to be signed. An ACH agreement allows a bank to debit the customer's account through the ACH method and then credit an account owned by the retail store. The ACH method utilizes electronic transfers as opposed to the conventional clearing path used by banks and other financial institutions in clearing a check. The retail store would have to convey transfer information regarding an account to be credited to the customer's bank. The retail store's account information may be included in the image of the check that is transferred. For example, if the item scanned is a check, an endorsement stamp may be added to the image which includes the bank and account number which is to be credited. Alternatively, the bank information could be added to the file as a separate line item.

The ACH agreement may be printed on the document using a number of the methods as described below in reference to FIG. 3. In another embodiment, step 92 is eliminated and the customer only has to sign the document once. The scanning system would add to the image any other fields which were desired, i.e., payee name and amount. Also, it is contemplated that a printer would then print this additional information on the document as a receipt, but such a step is not required.

Next, at step 94, the customer authorizes the transaction. This may be done via signing the document after the agreement has been printed on it, giving a verbal authorization, selecting a button on a communication screen, or signing an electronic signature pad. If a signature is used, it may be handwritten, stamped, or made via other conventional means, or may be, for example, an electronic signature. If verbal authorization is given, step 92 may be eliminated and the authorization need not be printed on the document. If verbal authorization is given, a printer may print "authorized verbally" or like terms on the document. Also, the image may be tagged with such indicia of authorization. At step 96, the check is placed into the scanner, for example, by a merchant selling goods or services to a customer, as discussed in connection with FIGS. 1, 3 and 4. Next, at step 98, the scanner, using full image scanning techniques, scans the check and obtains information from the check for use in the clearing and processing system. The scanner may scan for any indicia of cancellation. If some indicia of cancellation is found on the document (indicating that the document has already been processed), the process is terminated and the appropriate authorities may be informed. Also, if the document contains some cancellation, it is also contemplated that the document would not be returned to the customer but, instead, be held by the operator or issuing bank. At this point, the check images may be communicated via a communication link to a central clearinghouse (or central computer 18 as shown in FIG. 1) where the images are processed and payment authorization is made. Some indicia of cancellation is added to the check, either by the scanning system or by hand. Finally, at step 100, the check is returned to the customer, as described below.

Also, the check may be inscribed by a printer with the amount of the transaction, however, this is not required. This transaction amount may be keyed in by the operator using a traditional cash register or devices on the document scanning system. The merchant returns the check to the customer as the customer's receipt. In another embodiment, the check is kept by the business and a receipt is e-mailed or sent to the customer via other methods as is known in the art. Alternatively, a traditional paper receipt may be provided to the customer instead of or in addition to the return of the check.

Figure 3:
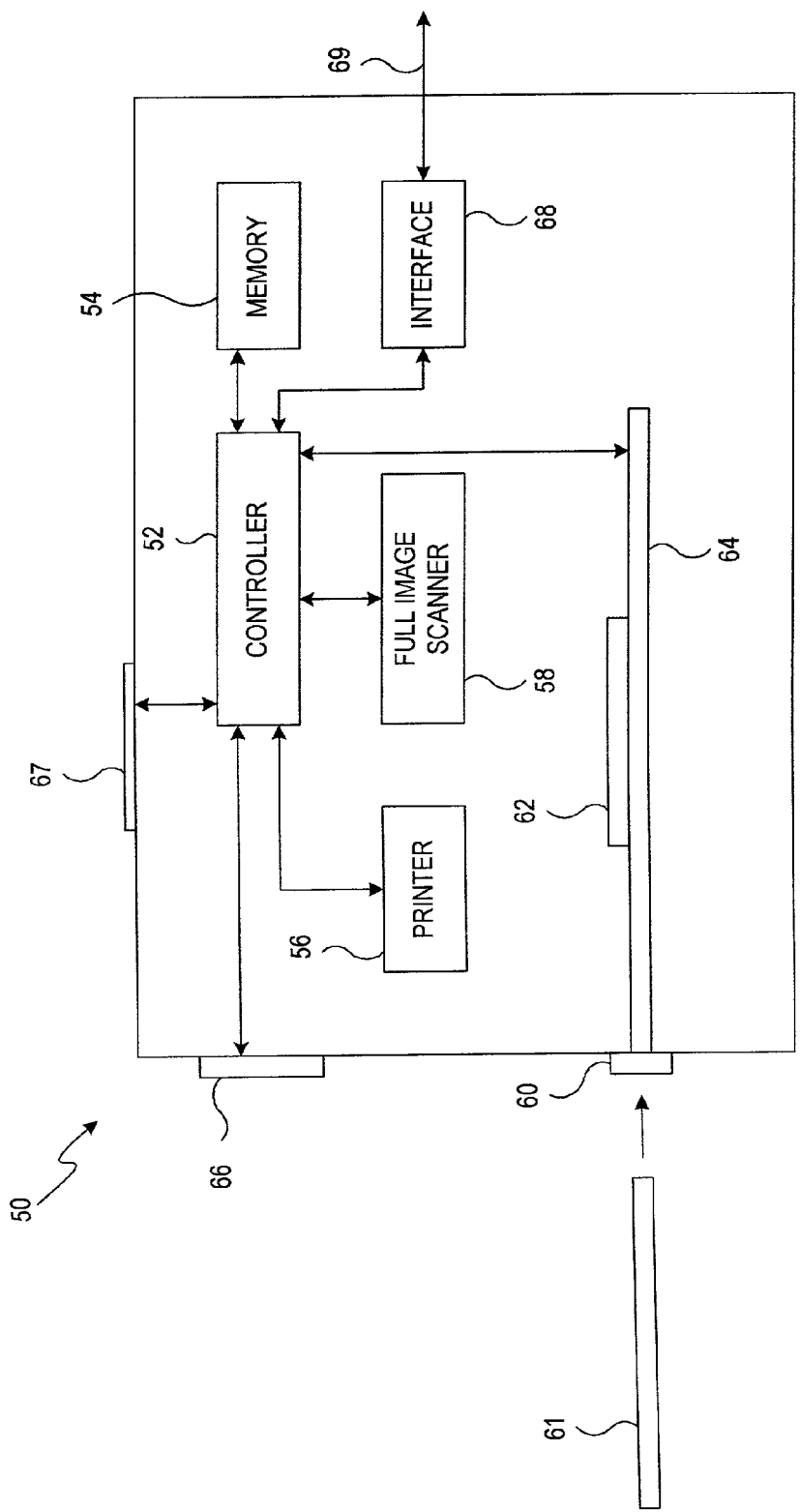
FIG. 3 is a block diagram of a remote scanner of a scanning system according to principles of an embodiment of the present invention.

Referring now to FIG. 3, the operation of a particular remote scanner 50 is now described. A document 61, such as a check, is placed into a slot or opening 60, which is a document receiving opening or receptacle, of the remote scanner 50. The document 61 moves to a position 62 via a transport mechanism 64. The transport mechanism 64 moves the document 61 past a printer 56 and a full image scanner 58, whose functions and embodiments will be described below.

The full image scanner 58, the printer 56, and the conveyer mechanism 64 are coupled to a controller 52. The purpose of the controller 52 is to activate the printer 56, when required, to activate the full image scanner 58, to direct images from the full image scanner 58, to create image files, and to direct the operation of the transport mechanism 64. The printer 56 may be comprised of a number of printers, each performing a different function. In one embodiment, the printer 56 may be comprised of an ACH printer used to print the ACH agreement on the document 61. Also, the printer 56 may have a transaction printer used to inscribe a transaction amount on the document 61, if desired. If the printer 56 is used to inscribe the transaction amount on the document 61, an operator could key in the transaction amount. The printer 56 may have a cancellation printer to be used to print some indication of cancellation on the document 61. In the embodiment where the customer only signs the document and the system must fill in the appropriate sections, the printer 56 may include a printer for printing the appropriate information in these sections. In one embodiment, the printer 56 would print the payee name as well as the transaction amount onto the document. It is also contemplated, however, that other information could be printed on the check, such as a reference number and/or date. It is also contemplated that there may be any number of printers performing any combination of these functions.

The printer 56 can be any type of conventional printer. For example, depending on the function the printer 56 is used for, it could be of the type that uses conventional printing wheels. If used only to print an ACH agreement or an indication of cancellation, the printer 56 may be a stamp. According to some embodiments, it is contemplated that the printer 56 may not be used or contained in the remote scanner 50. For instance, a system may be used where the amount is not inscribed on the document 61, and both the ACH (Automated Clearing House) agreement and the indication of cancellation is placed on the document 61 using hand stamps and/or separate printers. If a hand stamp is used to print the ACH agreement on the document, it is contemplated that the agreement would be worded as such to include both the ACH agreement as well as a promise to pay, thus, requiring the customer to only have to sign the document once.

In one embodiment, the scanner 58 houses a software program with optical character recognition (OCR) software which can compare the transaction amount written on the document 61 to the amount keyed in by the operator. The scanner 58 scans the document and the software identifies the amount printed on the document 61 from the image using OCR software or other conventional means. The system 10 is then able to compare the keyed transaction to the amount "read" by the scanner 58. In this way, errors between the keyed-in amount and the amount written by the customer are detected and can be communicated to the customer and/or the operator.

It is also contemplated that the OCR software could be utilized to read other information from the document 61. In some embodiments, it may be desired that the OCR read payor name, address, or any other information on the document 61.

Figure 4:
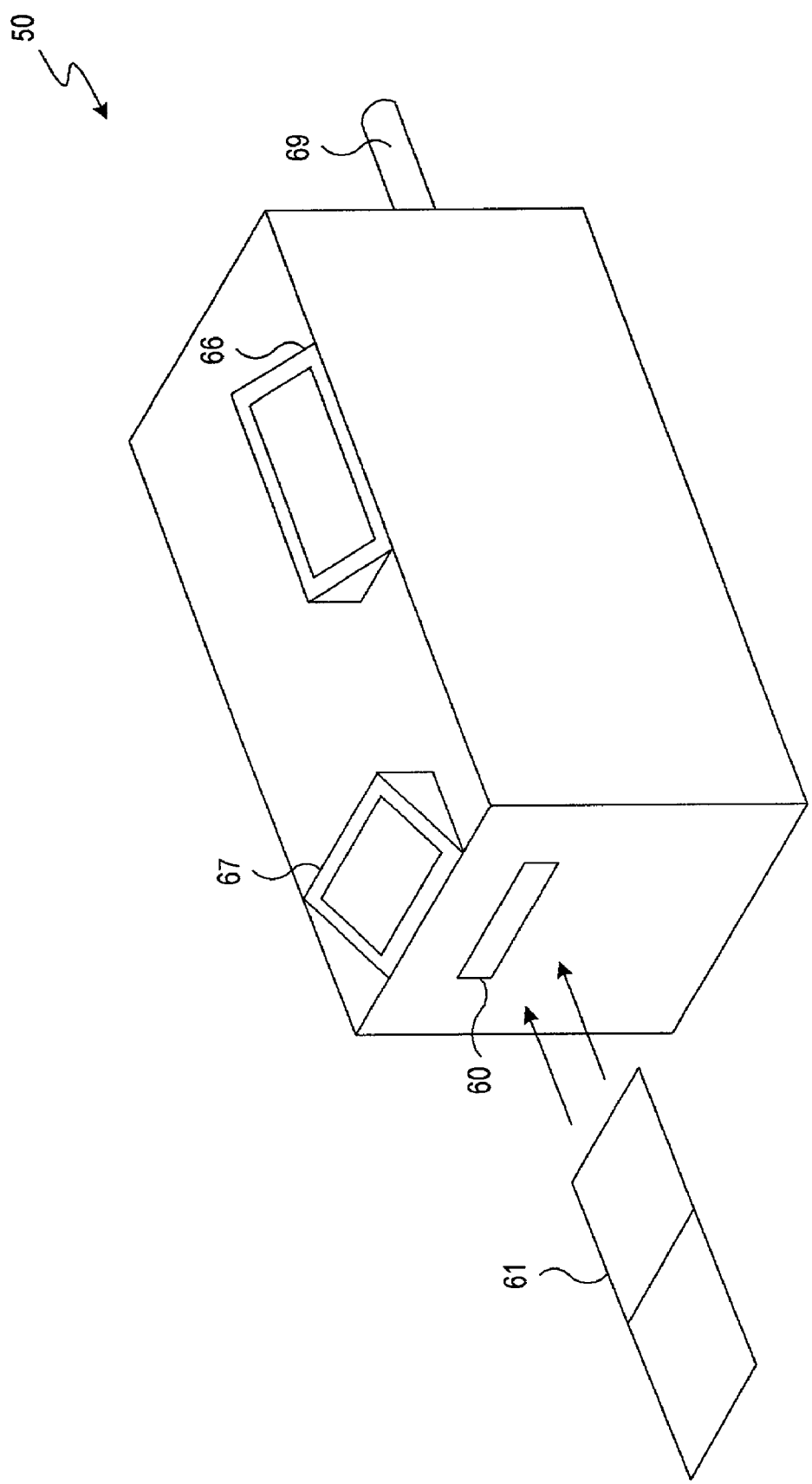
FIG. 4 is a perspective view of a remote scanner of a scanning system according to principles of an embodiment of the present invention.

With reference to FIG. 4, a perspective view of the remote scanner 50 is now described. An operator inserts a document 61 into a slot or opening 60. Information concerning the transaction is communicated to the operator via an operator interface 67, such as a display, a touch screen, or a video screen. The interface 67 can be a touch screen which can be used by the operator to communicate interactively with a central location. For example, the interface 67 can also be a communicational video screen which displays video images of the document as it was scanned. The screen may then prompt the operator to perform the next step, i.e., accept, reject, retry. As stated above, the document 61 is typically a check, but may be other documents, as well.

A second interface 66 may be provided to display information to a customer. This interface may also be a video screen or a touch screen as described above. In one embodiment, this interface may include a touchscreen button for authorizing the ACH transaction. Also, the button may be a separate "OK" button. This way, the customer only has to sign the document once. A communication link 69 is used to connect the scanning system 50 to a network of scanning stations and/or to the central computer 18 as is described in reference to FIG. 1.

Figure 5:
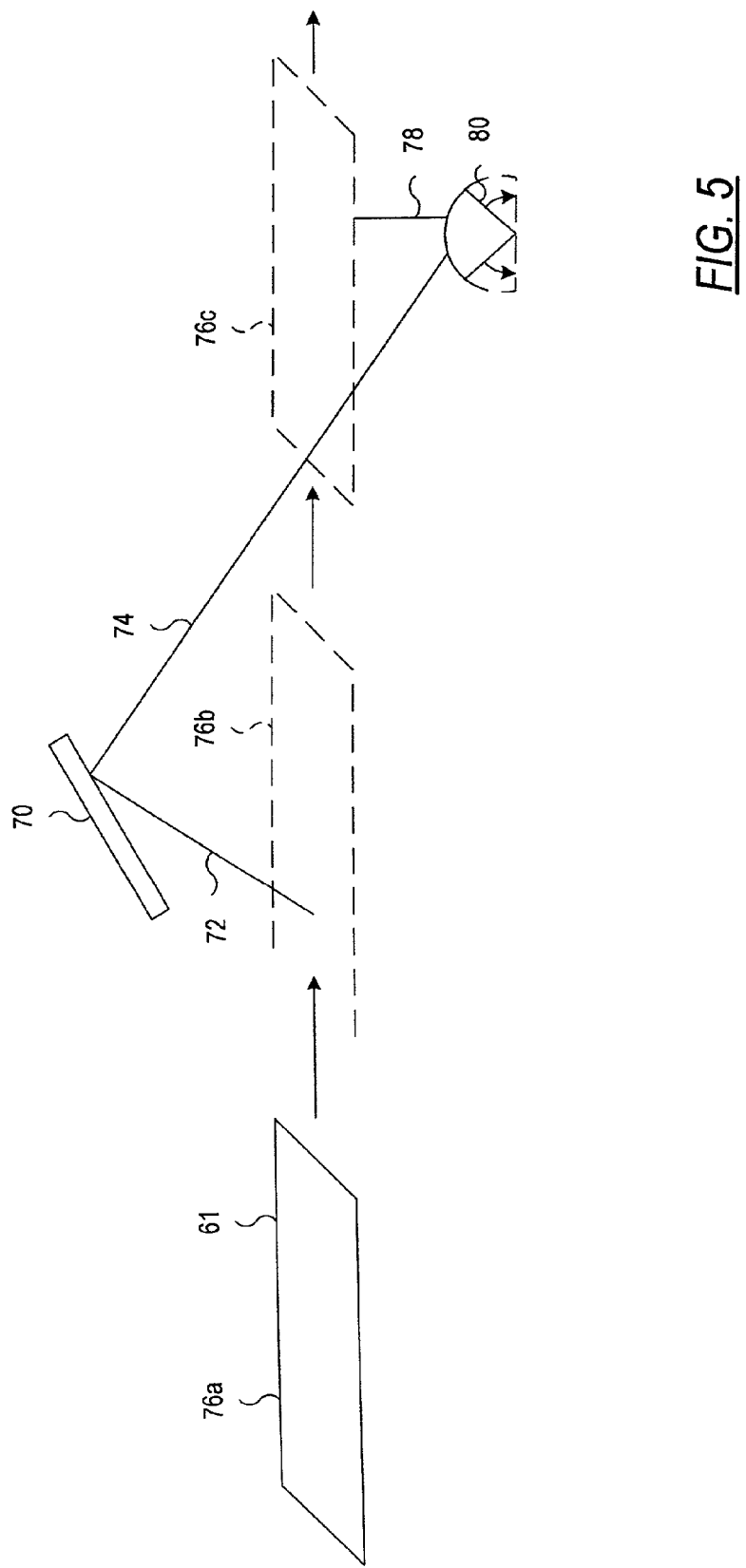
FIG. 5 is a block diagram of a remote scanner of a scanning system according to principles of an embodiment of the present invention.

One example of a scanning arrangement for use in the above-mentioned embodiments will be described in reference to FIG. 5. A document 61 having two sides, for example, a check, U.S. or foreign currency, or a deposit slip, is inserted into the scanning system 50 at position 76a. In the embodiment of FIG. 5, the scanning system 50 is adapted to scan both sides of the document 61. Often times, the document 61 contains valuable information on both sides and, thus, scanning the image of both sides can be useful. For example, if the document 61 is a check, a first (or back) side of the check may contain endorsement information, while a second (or front) side may contain payee and other information. After the document 61 is inserted into the scanner, the document 61 is transported past a scanning arrangement by the transport mechanism (not shown). When the document moves into a position 76b, the image of one of the first or second sides of the document travels along a first path 72 to a mirror 70. The image is then reflected by the mirror 70 along a second path 74 to a scanhead 80. The scanhead 80 is rotatable as shown. Thus, one side of the document is imaged using reflection techniques.

The document 61 then moves into position 76c where the image of the other of the first and second sides of the document is scanned by the scanhead 80.

Figure 6:
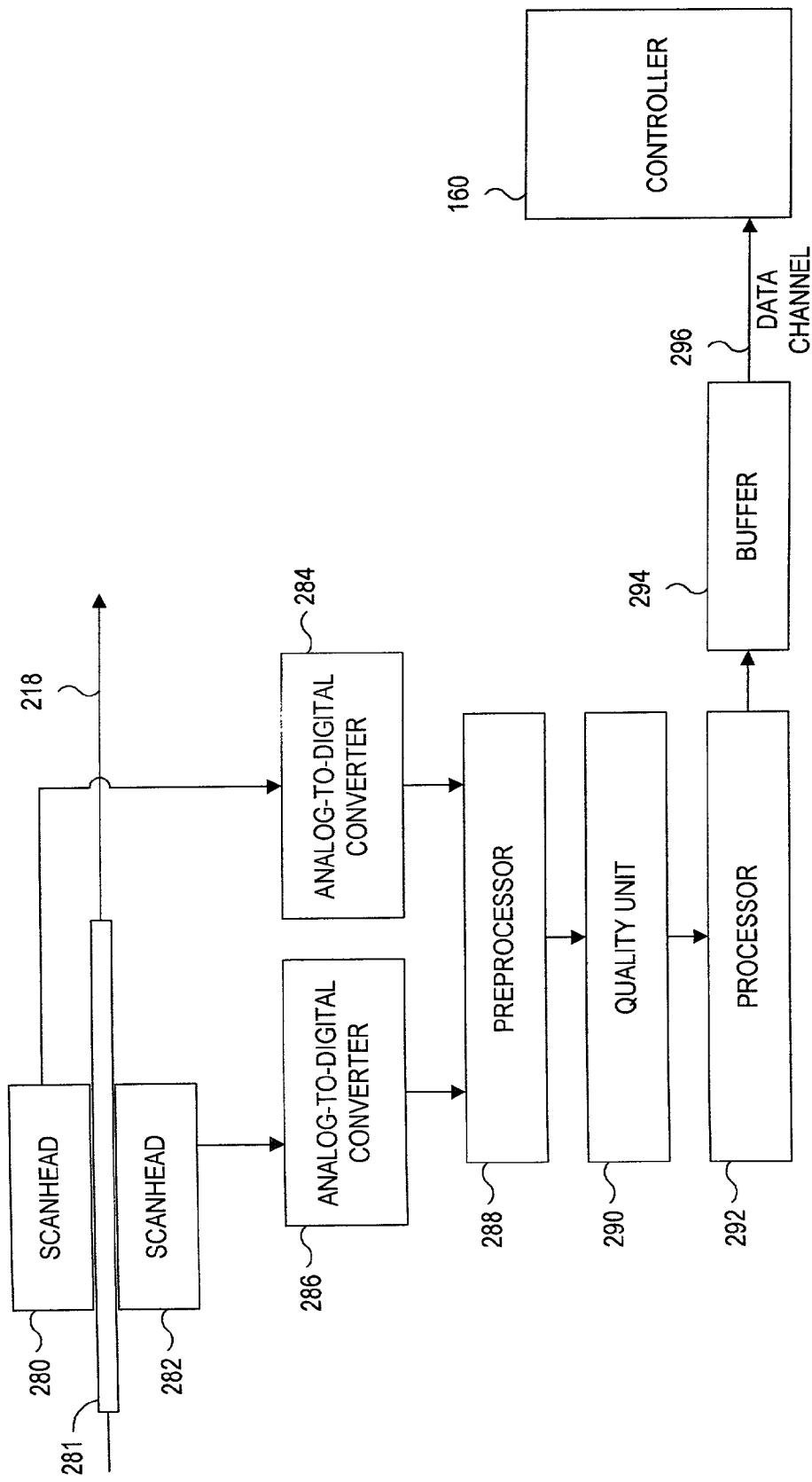
FIG. 6 is a block diagram of a remote scanner of a scanning system according to principles of an embodiment of the present invention.

In accordance with another embodiment of the present invention, the image scanner may be of the type disclosed in U.S. Pat. No. 4,888,812 which is incorporated herein by reference in its entirety. According to the embodiment of FIG. 6, the front and back surfaces of a document 281 are scanned by scanheads 280, 282 and the images processed into video image data by electronic circuitry. The scanheads 280, 282 are preferably charge coupled scanner arrays and generate a sequence of analog signals representing light and dark images defining the image on the document 281. The scanheads 280, 282 are arranged for simultaneously scanning both the front and back of the document 281, and are connected respectively to analog-to-digital converters 284, 286 which convert the analog values into discrete binary gray scale values of, for example, 256 gray scale levels. Alternatively, the scanheads may be arranged in an offset or non-overlapping manner. For example, a non-overlapping arrangement may be useful in isolating light detected by each scanhead. The scanheads 280, 282 may be capable of obtaining images of varying resolutions. The particular resolution chosen, which can be varied by the operator, is selected based upon the type of document being scanned, as is known in the art.

According to an embodiment, the high resolution gray scale image data from the analog-to-digital converters 284, 286 is directed to an image data preprocessor 288 in which the data may be enhanced and smoothed and which serves to locate the edges of successive documents. Irrelevant data between documents can then be discarded. If the documents are slightly skewed, the image preprocessor 288 can also perform rotation on the image data to facilitate subsequent processing.

The image data may be monitored for unacceptable image quality by an image quality unit 290. For example, the image quality unit 290 may monitor the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition may be generated.

The image data is transmitted from the quality unit 290 to the image processor 292. The image processor may add items to the image. For example, if a document bearing only a signature is scanned (according to one embodiment discussed above) the image processor may add a transaction amount, a payee, and/or other information as needed to the image. As is known in the art, the optical scanners can additionally scan specified fields on the faces of the document. For example, when processing checks, the scanhead may be directed by the OCR software to search for the "$" symbol as a coordinate to the left of the numeric check amount field box. As is known in the art, a straight coordinate system or dimension system may be used where known dimensions of the box are used to locate the field. Also, when scanning currency, the scanhead may be directed by the OCR software to search for the serial numbers printed at defined locations which the image processor 292 can locate. The processor 292 can be programmed to locate fields for various types of currency and perform processing. Based on scanning certain areas on the currency or document, the processor 292 first identifies the type of document, such as type of currency, for example, U.S. bank notes. Then, based on the outcome of the previous step, certain fields of interest are located and the information is stored for use by the system. For checks, fields of interest may include the name of the bank, the account number and the amount of the transaction. For U.S. bank notes, the fields of interest may include the dollar amount. For deposit slips, the fields of interest may include the bank name, account number, total amount of deposit, and amount of individual checks or currencies deposited. The processor 292 may also compress the image data, as is known in the art, in preparation for transmission to an outside location and/or storage.

The amount of image data per document may vary depending on the size and nature of the document and the efficiency of the data compression and reduction for that particular document. To insure that no data is lost in the event that the volume of image data temporarily exceeds the transfer capacity of a data channel, such as a high speed data channel, a pre-channel buffer 294 is interposed prior to the data channel, which is connected to the controller 160. The capacity of the pre-channel buffer 294 is continually monitored by the controller 160 so that appropriate action may be taken if the buffer becomes overloaded. The compressed video image data is received by the controller over, for example, a high-speed data channel 296 and is initially routed to temporary storage. The pre-channel buffer 294 is preferably of a size capable of storing image data from at least several batches or runs of checks or similar documents, each batch or run containing several checks or documents. The controller 160 in the scanning system directs the full image scanner to perform the functions of analyzing the data. Alternatively, as discussed above, analysis of the data can occur at a central office computer or at a personal computer attached to the system.

A personal computer or alternate means may be used to create images of electronic documents that are electronic images only. That is, such documents may be created without scanning physical documents. In such a system, computer software electronically creates an image of a document, such as a check. A special printer (not shown) may be connected to the system to print documents with fields of interest. In this embodiment, an actual check is never scanned. An image of a check is created on the personal computer or on the scanning system 50.

A plurality of remote scanners may be connected in a "hub and spokes" network architecture as is known in the art. Likewise, other network architectures may be used. In order to prevent congestion, the image buffer on each document processing system stores data until polled by the controller or an outside accounting system. By "outside accounting system," it is meant to include the hardware and software associated with accessing, maintaining, tracking, and updating savings accounts, checking accounts, credit card accounts, business and commercial loans, consumer payments, and all other similar accounts at locations remotely (i.e., not associated with the scanning system host computer) located from the full image scanners. The term includes three broad types of systems: systems where deposits are made, systems where withdrawals are made, and systems where both deposits and withdrawals are made. Although the outside accounting system described herein is described as being employed at a financial institution such as a bank, it will be understood that any business, public or private institution, or individual can employ an outside accounting system to process transactions. When polled, the data may be uploaded per batch or per document to the controller or accounting system.

A brief description of how the process works follows. When checks are utilized in a transaction, the check is tagged with the customer checking account number, the bank's routing number, and the Federal Reserve Region. If multiple banks are involved in the payment, each bank's routing number is tagged to the payment through an endorsement on the back of the check. Alternatively, the system could tag the checks electronically. In other words, the customer checking account number, bank routing number, check number, amount, and Federal Reserve region may be electronically tagged to the check's image. Tagging also occurs on current electronic payments, such as wire transfers.

The ACH or outside accounting system processes information associated with checking accounts which can be held by individual consumers, businesses, trade associations, trusts, non-profit organizations, or any other organization. Documents utilized in the checking account function include checks, checking account deposit slips, debit or credit slips which may be issued by the bank against the checking account, new account application forms, and forms for customers to reorder check and deposit slips. The fill image scanner of the present invention may process all of these documents. The documents could be received at a full image scanner located at a teller line, a drive-up window, an ATM or, alternatively, the documents may be received by mail. If received by mail, the bank employee may immediately run the documents through a full image scanner without having to forward the documents to a central location for processing. The outside accounting system maintains a record of all transactions regarding the checking account and balances, and tracks information associated with a particular check.

Various other types of documents may be utilized by a bank. For example, a bank may maintain a trust for an individual, such as a retirement trust account. An outside accounting system can maintain all types of information regarding these types of accounts, such as account balances, interest earnings, and maturity dates.

The outside accounting system may also maintain records and manage information concerning mortgages, consumer loans, and student loans. The outside accounting system may maintain records such as the loan balance, last payment, interest rate, and amount paid.

The outside accounting system may also permit distribution of finds between the various accounts described above. For example, an individual with checking and savings accounts at a bank may also hold a mortgage with the bank. The outside accounting system can make monthly withdrawals from the checking account or savings account to pay the monthly mortgage amount due the bank. To accomplish this, the customer may issue a check for payment and submit this against a coupon provided to the customer by the bank with the required monthly mortgage payment. The coupon and the check (or savings withdrawal and coupon) may be run through the full image scanner (at the teller line or automated teller). The information is read by the full image scanner and transmitted to the outside accounting system which conducts the required transfers. This is done in the same manner as a check is imaged and presented for payment as discussed above.

Other scanning modules and methods can be used in place of or in addition to the ones described above. These include CCD array systems, multi-cell arrays, and other well-known scanning techniques. Examples of these techniques and devices are described in U.S. Pat. Nos. 5,023,782, 5,237,158, 5,187,750, and 4,205,780, all of which are incorporated herein by reference in their entirety. The scanning module can also be a color image scanner such as the type described in U.S. Pat. No. 5,335,292, which is incorporated herein by reference in its entirety.

Figure 7:
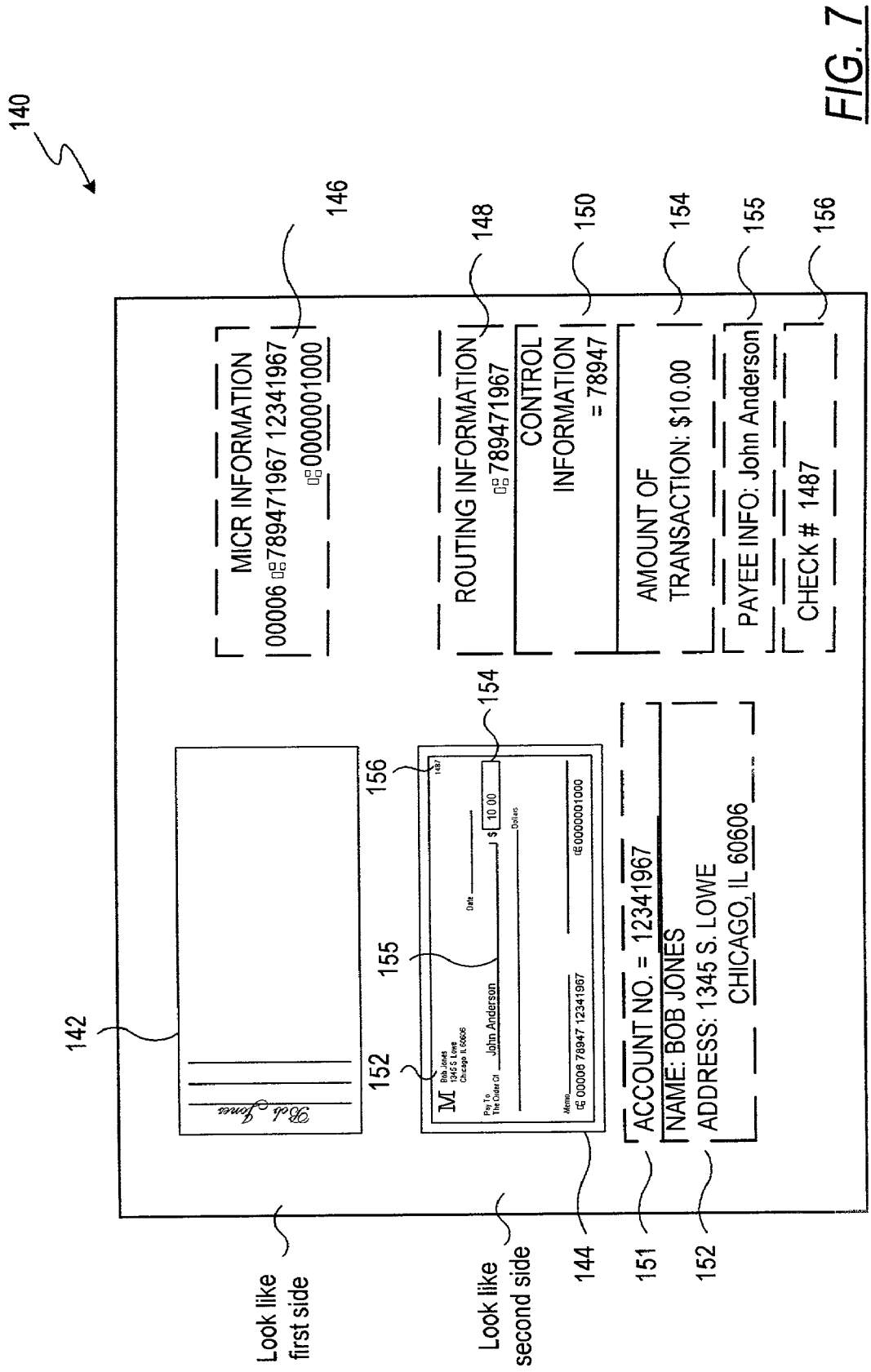
FIG. 7 is a block diagram describing an image file according to principles of an embodiment of the present invention.

Referring now to FIG. 7, an image file according to one embodiment is described. The image file 140 comprises several parts. An image section 142 represents one side of the scanned document. The image is a collection of encoded data and is represented here pictorially so as to be readily understandable to those skilled in the art. In the check sample shown in FIG. 7, the image 142 is the back side of the scanned document, namely, a check. Similarly, image area 144 comprises data representing the reverse side of the document, in this case, the front side of the check. Area 146 represents MICR data extracted from the full image scan in the MICR line of the document shown in image area 144. Areas 148, 150 represent, respectively, routing and control information. The routing and control information is needed so that the image file can be transmitted among financial institutions. In other words, the bank to which the image file belongs can be easily recognized by any point in the network to which the scanners are attached.

A field 151 may contain the account number for the check extracted from the image of the check, a field 152 contains data indicating the owner of the account, a field 154 represents the amount of the current transaction which was applied to the file 140 by the scanner, a field 155 contains payee information, and a field 156 indicates check number. It should be recognized that the fields illustrated are not inclusive of all possible fields and types of information which can be stored in the image file 140. Indeed, other types of information can be stored as can pointers to other files having, for example, further information relating to the customer. For example, in the case of payment coupons, the fields may include the customer utility account number. In some cases, it may also be useful to read the memo line of the check. Also, it is contemplated that an operator or the image processor may fill in some of these fields. For example, in the embodiment of the present invention which only requires the customer to sign the document, the payee field and amount field may be added to the image before it is processed. The format of the file is standardized for ease of processing, i.e., using .tif or .jpg. This allows other software to process the information in image files for use by the merchant or financial institution.

Figure 8:
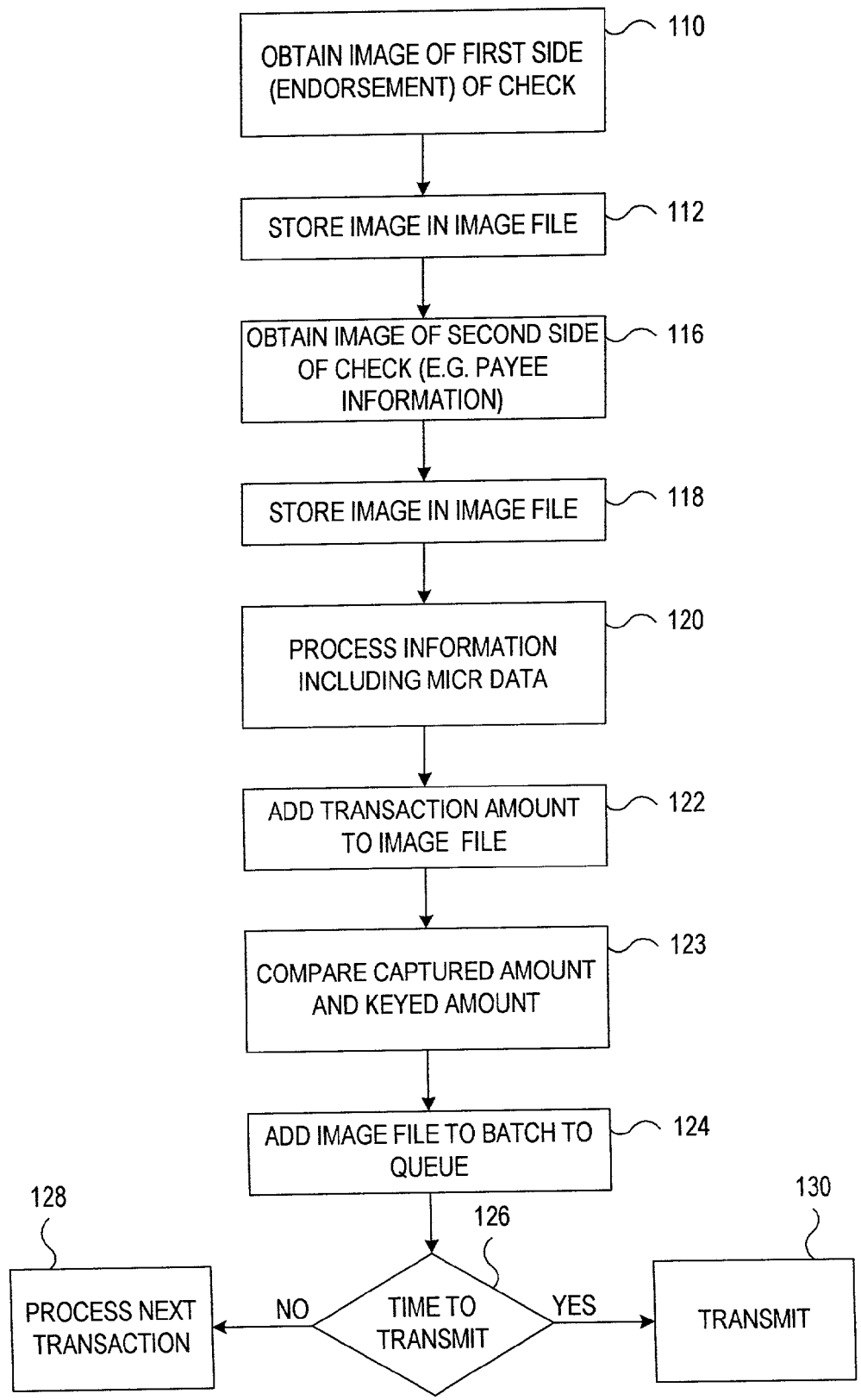
FIG. 8 is a flowchart describing the operation of a remote scanner of a scanning system according to principles of an embodiment of the present invention.

Referring now to FIG. 8, the operation of the scanner according to one embodiment is now described. At step 110, an image is obtained of the end-most portion of a reverse side of a check, the portion which contains the customer's endorsement. At step 112, this image is stored in an image file. At step 116, the image of the front side of the check (or other document) is captured. For example, payee information, such as the name of the retail store, bank name, and account number, can be determined from this image data, as discussed in step 120. At step 118, the image may be stored in the same image file mentioned in step 114.

At step 120, the information from the image of the endorsement which was captured and stored in the image file may be processed. For example, the customer's name and signature may be identified. From the name information, signature verification can occur. The OCR software may then compare the signature on the check with the signature on file for that particular account. With the name identified, other information concerning the customer, for example, address and phone number, can be determined.

Also at step 120, the information obtained in step 116 is processed, and information such as MICR information, payee, and bank name is optically obtained from the image data. It is one aspect of the present invention that image data containing the MICR data is optically obtained, rather than magnetically reading the MICR data. This is not to say that MICR data could not be determined using a conventional MICR data magnetic reader, as is known in the art, together with a full image scanner. From the image of the MICR line, the data encoded can be extracted, such as by conventional character recognition methods.

At step 122, the transaction amount, keyed in by the merchant, is added to the image file. The amount may be keyed directly into the scanner or input into the scanner from an external source, such as a cash register. Also, the amount can be captured from the image file and compared to the keyed amount at step 123. The amount may be captured from either the courtesy amount, which is the numeric amount or the legal amount which is the written out dollar amount. At step 124 the image file is added to a batch of files to be queued. At step 126, it is determined whether it is time to transmit the next group of image files, which may be multiple check images (a batch) or a single check image. If the answer is affirmative then, at step 130, the batch of image files is transmitted. These image files are transmitted to an ACH processing center. If the answer at step 126 is negative then, at step 128, the system begins processing the next transaction.

Figure 9:
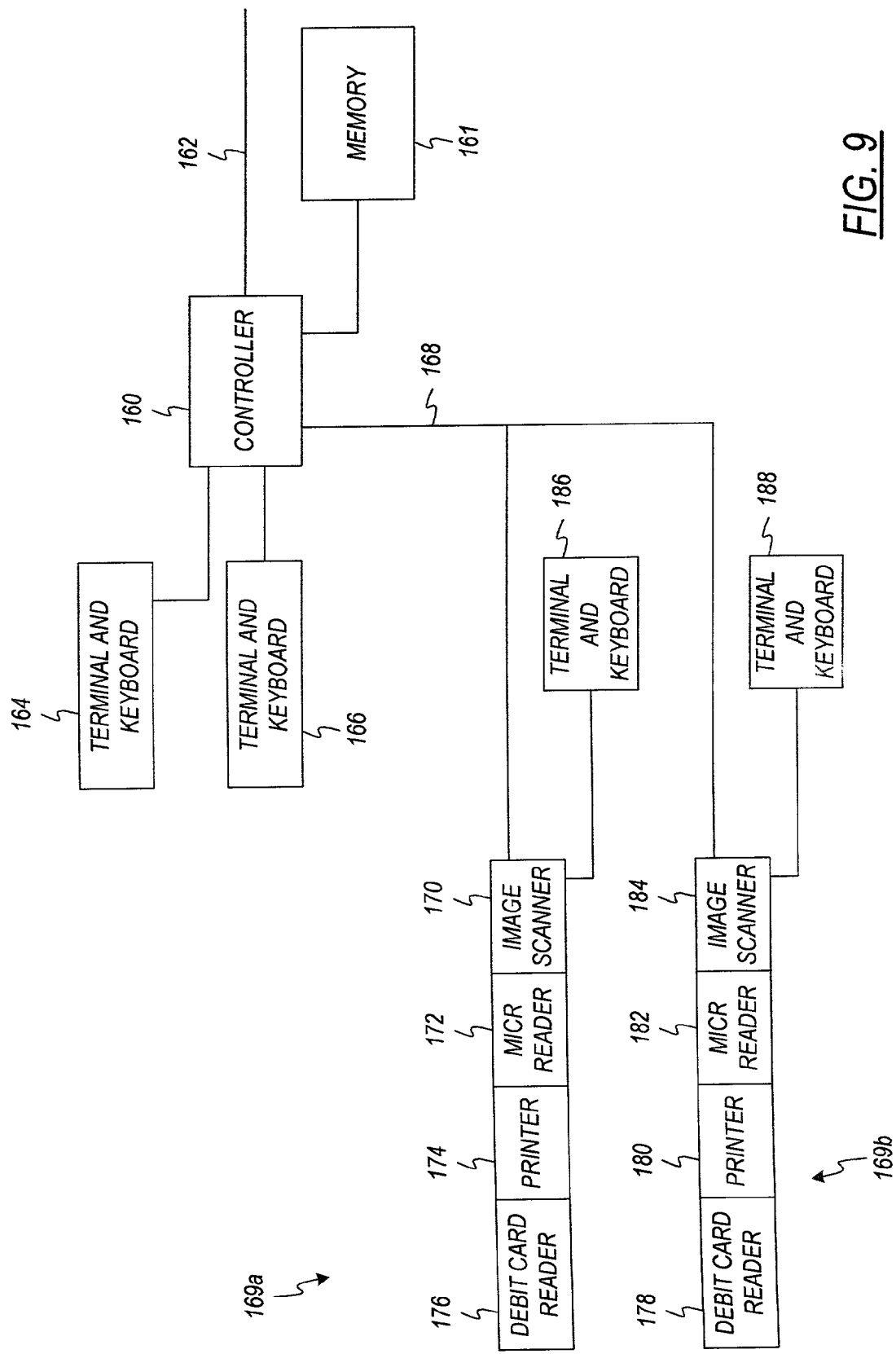
FIG. 9 is a block diagram of a scanning system according to principles of an embodiment of the present invention.

Referring now to FIG. 9, another embodiment of the scanning system of the present invention is described. A controller 160 is coupled to an outside communication channel 162. The purpose of the controller 160 is to direct the operation of the scanning system as described below. The controller 160 is coupled to a terminal and keyboard 164 and a terminal and keyboard 166. The terminals and keyboards 164, 166 allow a user to access information which is stored in a memory 161 which is coupled to the controller 160.

The controller 160 is coupled to an internal communications channel 168. The internal communications channel 168 is coupled to scanning arrangements 169*a*, 169*b*.

The scanning arrangements 169*a*, 169*b* comprise, respectively, debit card readers 176, 178, printers 174, 180, MICR readers 172, 182, and image scanners 170, 184, and are coupled to a terminal and keyboard 186, 188, respectively.

Image scanners 170, 184 may be of the type having one scanhead described above. Alternatively, scanners having two scanheads may be used as described below. The image scanners obtain a full image of the document, and the OCR software may be programmed to analyze the full image or to analyze only specified fields. For example, with a check, the OCR software may be programmed to read an image of the endorsement fields of the check and the amount fields of the check.

The memory 161 stores information obtained via the scanning arrangements 169*a*, 169*b*. The information is stored in a database in the memory 161 and may be in the format of an image file. The information contained within the database is information obtained by the scanning arrangements 169*a*, 169*b* and would include, for example, information from scanned checks (signatures, identity of check writer, amount), MICR data obtained from the MICR readers 172, 182, and information obtained from the debit card readers 176, 178.

The controller 160 has software which processes information obtained from the image scanners 170, 184. For example, this software is used to obtain signature information (e.g., identify the signature by name) from the image data or read the amount data from the amount field of the check if the document is a check (e.g., via OCR software).

The MICR readers 172, 182, if used, magnetically obtain MICR data from the document (for example, the check) and report this information to the controller 160. The printers 174, 180 are used to print information on the document, for example, the ACH agreement. Control of the printers is directed from the controller 160 although, alternatively, control can also originate from the operator or clerk at the terminals and keyboards 186, 188.

As mentioned above, the terminals and keyboards 186, 188 are coupled to the scanning arrangements 169*a*, 169*b*. The purpose of the terminals and keyboards 186, 188 is to allow operators to access information either scanned in from one of the scanning arrangements or to access information contained in the memory 161. Alternatively, the terminals and keyboards 186, 188 may be used by a customer to enter information or to view a subset of the information stored in the memory 161. For example, the keyboards and terminals may be used to change an amount, search for a particular entry, and view any duplicate images.

Figure 10:
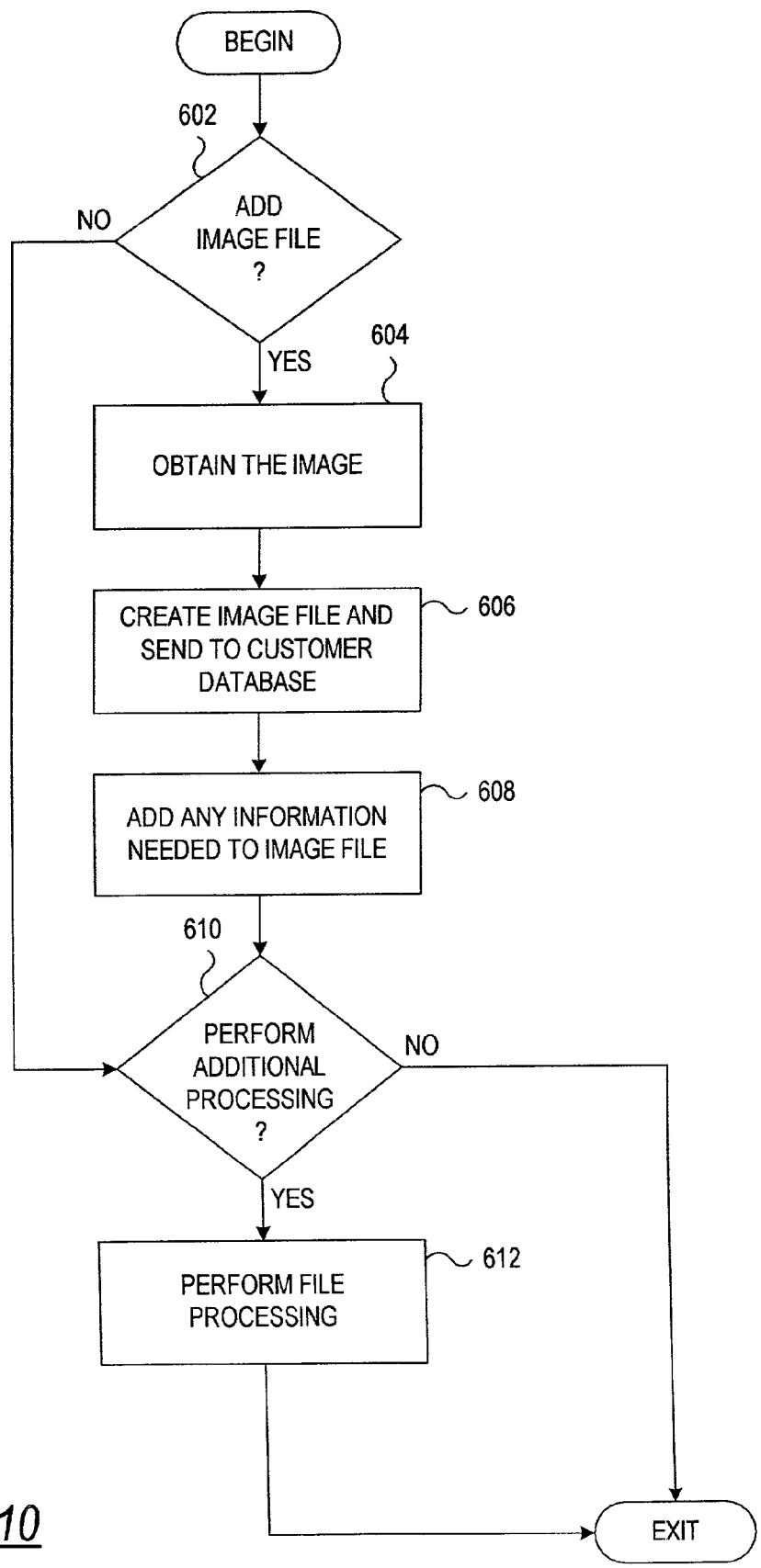
FIG. 10 is a flowchart describing the processing operations performed on images or image files according to principles of an embodiment of the present invention.

Referring now to FIG. 10, one embodiment of the processing operations performed on the image files is now described. At step 602 the system determines whether a new image file is to be added to the database. If the answer at step 602 is negative, execution continues at step 610 as described below. If the answer at step 602 is affirmative, then execution continues at step 604.

At step 604, the system obtains the image from one of the remote scanners. Next, at step 606, the system then creates the image file in the format specified above, for example, in connection with FIG. 7. As stated above, the image file may be of a standard format that is recognizable by all elements of the system. Also at step 606, the image file is added to the customer database at the remote site. Although, according to one embodiment, the image file is added to the database at the remote site, the image file can be transferred to a central site, such as the site of the financial institution, for storage. In yet another alternative, the image file can be stored at both the remote site and the central site.

Next, at step 608, any needed information is added to the image file. For example, system-related information for indexing purposes may be added to the file. Also, housekeeping or formatting information may be added to the file. For example, any information, such as originating location, customer information, demographics, store number, and audit/control numbers, added by the operator or read by the OCR software may be added to the image file.

At step 610, the system determines whether any additional processing is to be accomplished. If the answer is negative, the operation is concluded. If the answer is affirmative, then execution continues at step 612. It should be noted that the additional processing performed can be automatic, on a case-by-case basis, or a mixture of both types. For instance, every time an image file arrives, it should be added to the database. Periodically, reports can be created specifying the activities of a particular customer, a group of customers, or a category of customers. For instance, if the database contains information concerning the customer's ages, a report can be created giving the spending activities of customers of a particular age. Also, the brand names or categories of merchandise purchased by the customer may also be part of the database. The image file and information regarding this can be collected and compared against all customers and customers who meet certain predefined criteria, for example, age, income, or residence. The software used can be custom-designed or any of the commercially available software as is known in the art.

At step 612, this processing occurs. When the processing is complete, execution is complete.

Figure 11:
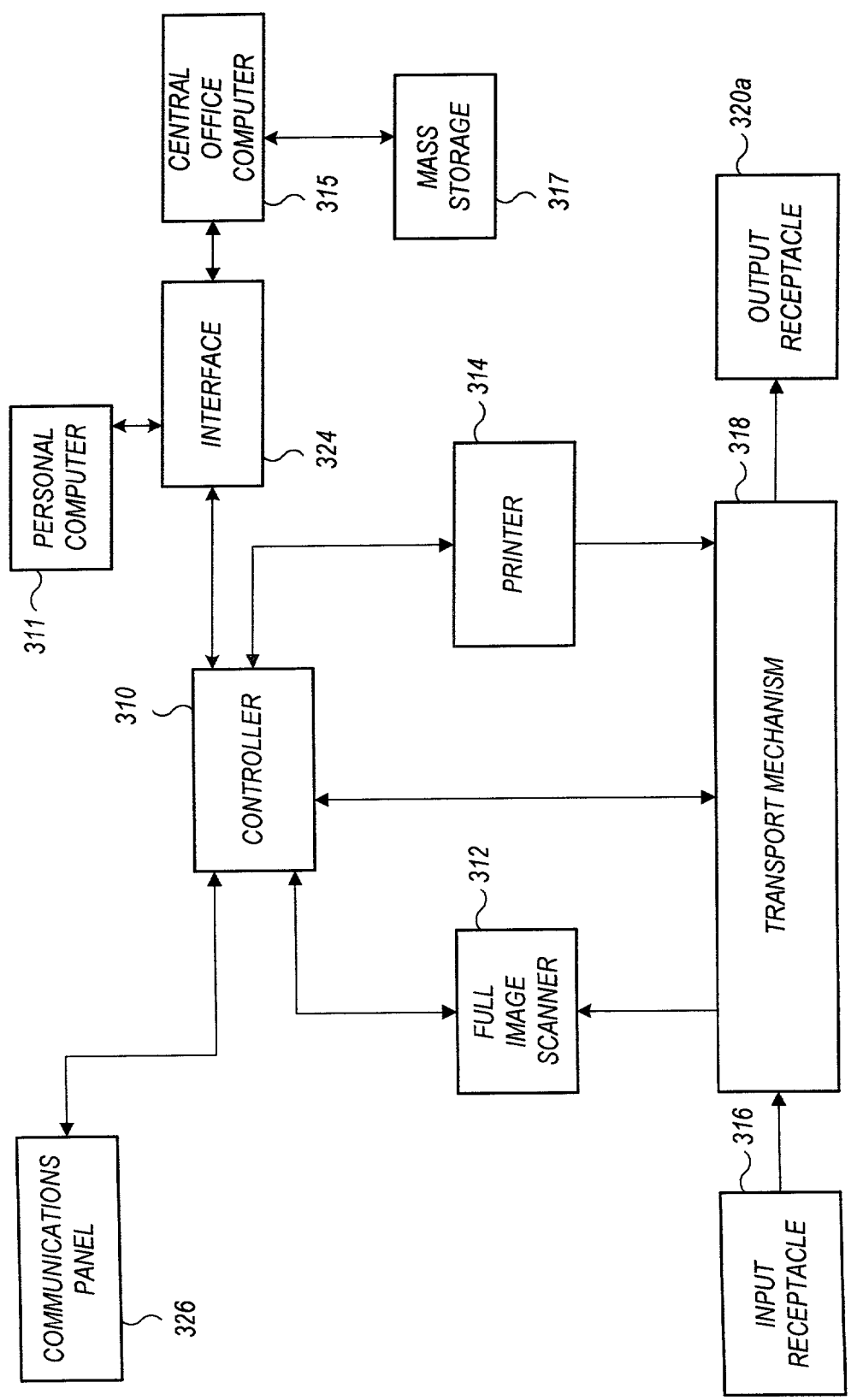
FIG. 11 shows a block diagram of the components of a document and currency processing system with a single output bin according to principles of an embodiment of the present invention.

Another embodiment of a scanning system is now described. As illustrated in FIG. 11, an input receptacle 316 is provided to receive documents deposited by an operator. As stated above, by "documents," it is meant to include checks, coupon and loan payment documents, food stamps, cash tickets, savings withdrawal tickets, check deposit slips, savings deposit slips, bank notes, and all other documents utilized as a proof of deposit at financial institutions. It is also meant by the term "documents" to include loan applications, credit card applications, student loan applications, accounting invoices, debit forms, account transfer forms, and all other types of forms with predetermined fields. A transport mechanism 318 transports the documents from the input receptacle 316 past a full image scanner 312 as the documents are illuminated by a light (not shown). The full image scanner 312, such as described above, scans the full image of the document, recognizes certain fields within the document, and processes information contained within these fields in the document, such as extracting data from the images of the documents. For example, OCR software may be used to extract data which can be stored in ASCII or other text formats. The system may also be used to capture any document image for electronic document display, electronic document storage, electronic document transfer, electronic document recognition (such as denomination recognition or check amount recognition) or any other processing function that can be performed using an electronic image.

Figure 12:
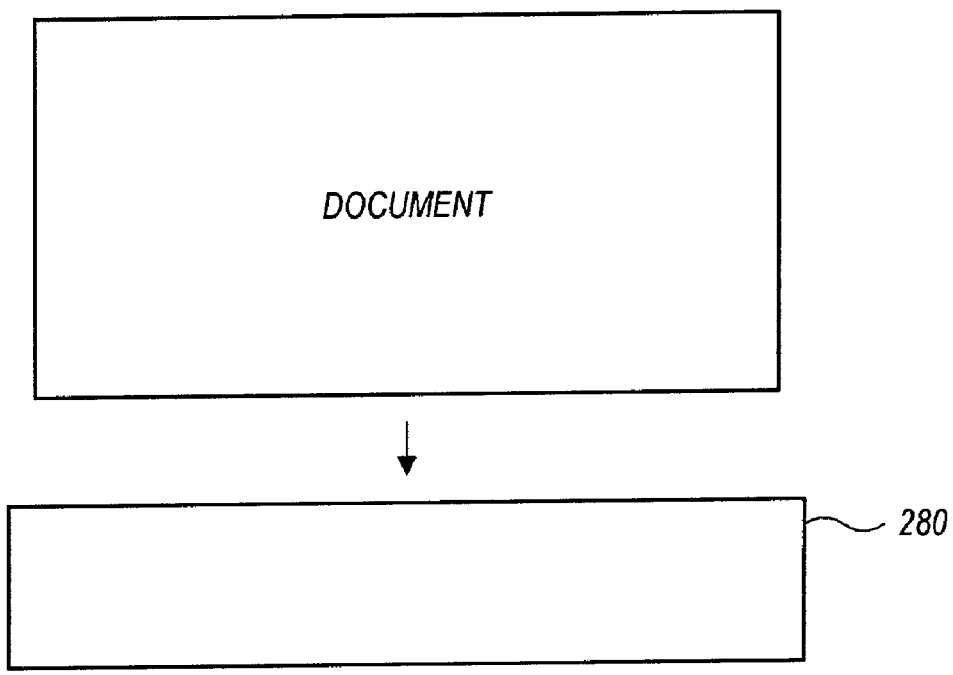
FIG. 12 is a top view of a document being scanned by the full image scanner in the wide dimension.
Figure 13:
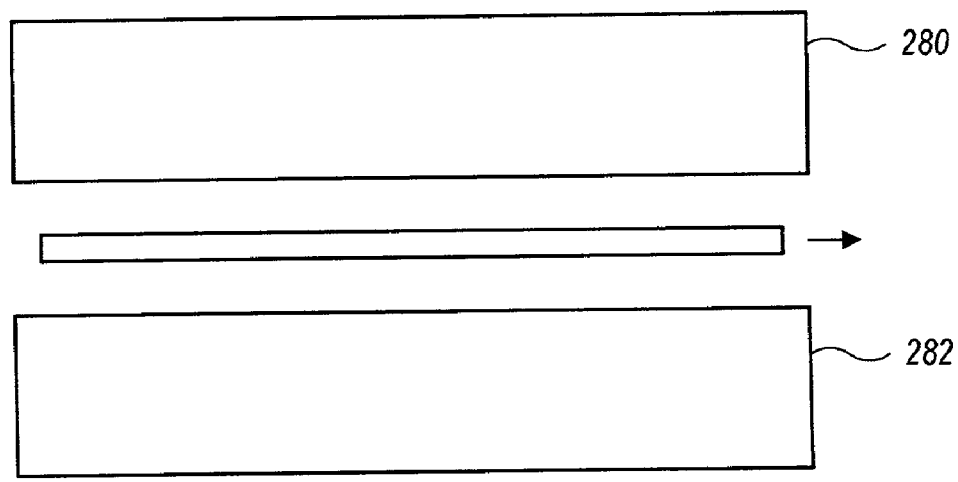
FIG. 13 is a side view of a document being scanned by the full image scanner in the narrow dimension.

A controller 310 manages the operation of the system. The controller 310 directs the flow of documents from the input receptacle 316 through the transport mechanism 318, past the full image scanner 312, and into an output receptacle 320*a*. Alternatively, the input and output receptacles may be the same or a plurality of output receptacles may be provided. The transport mechanism may direct the documents through the system in a wide-edge feed manner such that the documents' longer edge is perpendicular to the direction of transport as shown in FIG. 12. Alternatively, the transport mechanism may direct the documents through the system in a narrow-edge feed manner such that the documents' longer edge is parallel to the direction of transport as shown in FIG. 13. The controller 310 also routes information from the fill image scanner 312 to an interface 324 which communicates with an outside accounting system (including the ACH processing center) or central office. The controller 310 is also capable of directing information from the outside accounting system through the interface 324 to a communications panel 326. Finally, the controller 310 may selectively process information from the full image scanner 312 for use by the system.

"Outside accounting system" is defined the same as above, as is "financial institution."

A printer 314 is used to print the ACH agreement on the document. The timing of the printing operation is controlled by the controller 310. According to one embodiment, the printer 314 automatically prints the ACH agreement on the document.

The system, via the link with a central office computer 315, may process transactions substantially immediately. That is, withdrawals may be processed in real time, rather than waiting for the end of the day. Also, full images of all documents can be stored on mass storage devices 317 at the central office. The images could also be stored at the unit itself or at another remote system. The images could also be temporarily stored and forwarded at a later time.

A personal computer 311 may also be connected to the system. The personal computer can also be used to process data from the scanning modules 312. Processing of scanned data can occur at the personal computer 311, within the full image scanning module 312 or at the central office computer 315.

Figure 14:
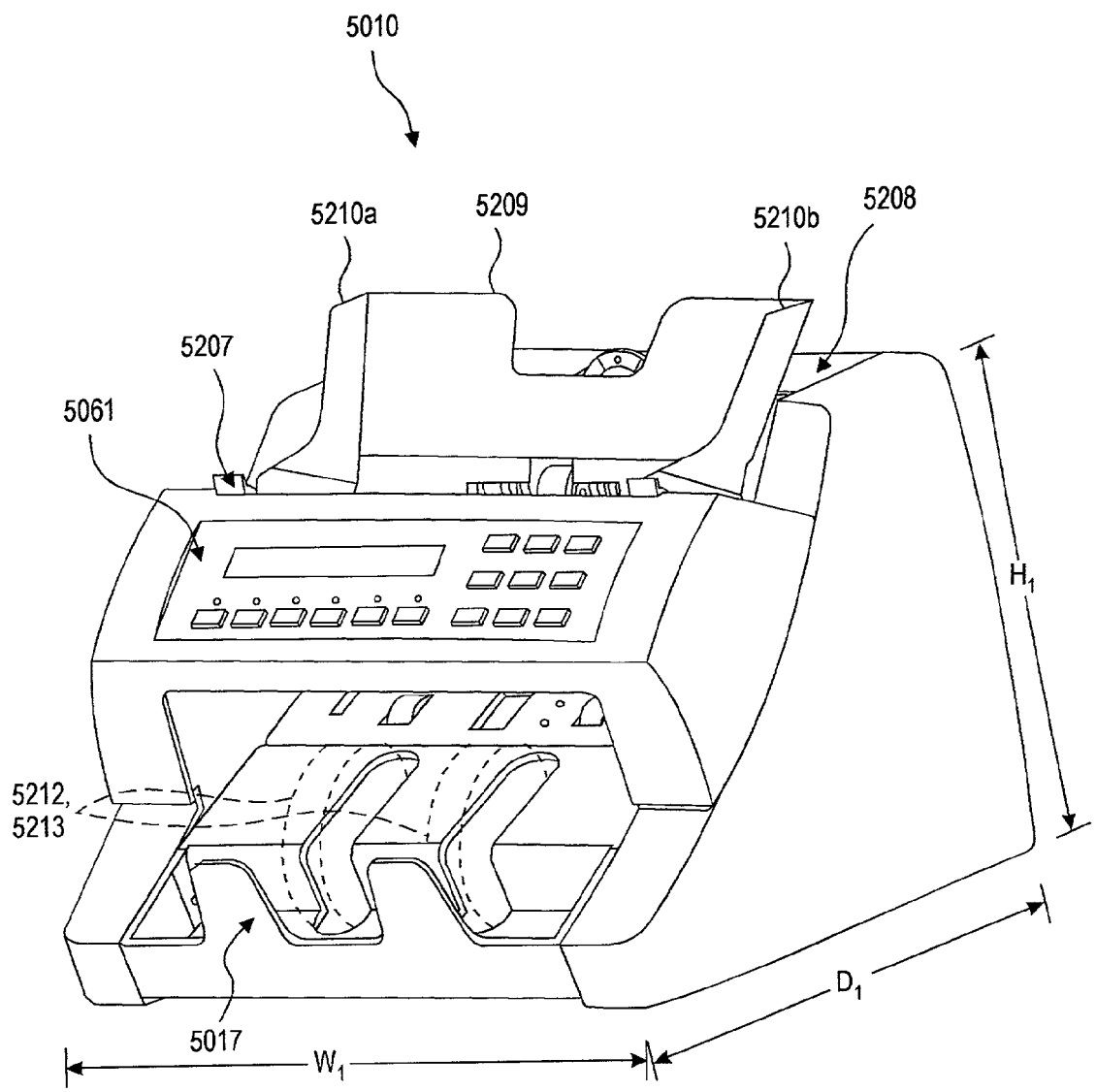
FIG. 14 is a perspective view of a compact document processing system according to principles of an embodiment of the present invention.
Figure 15:
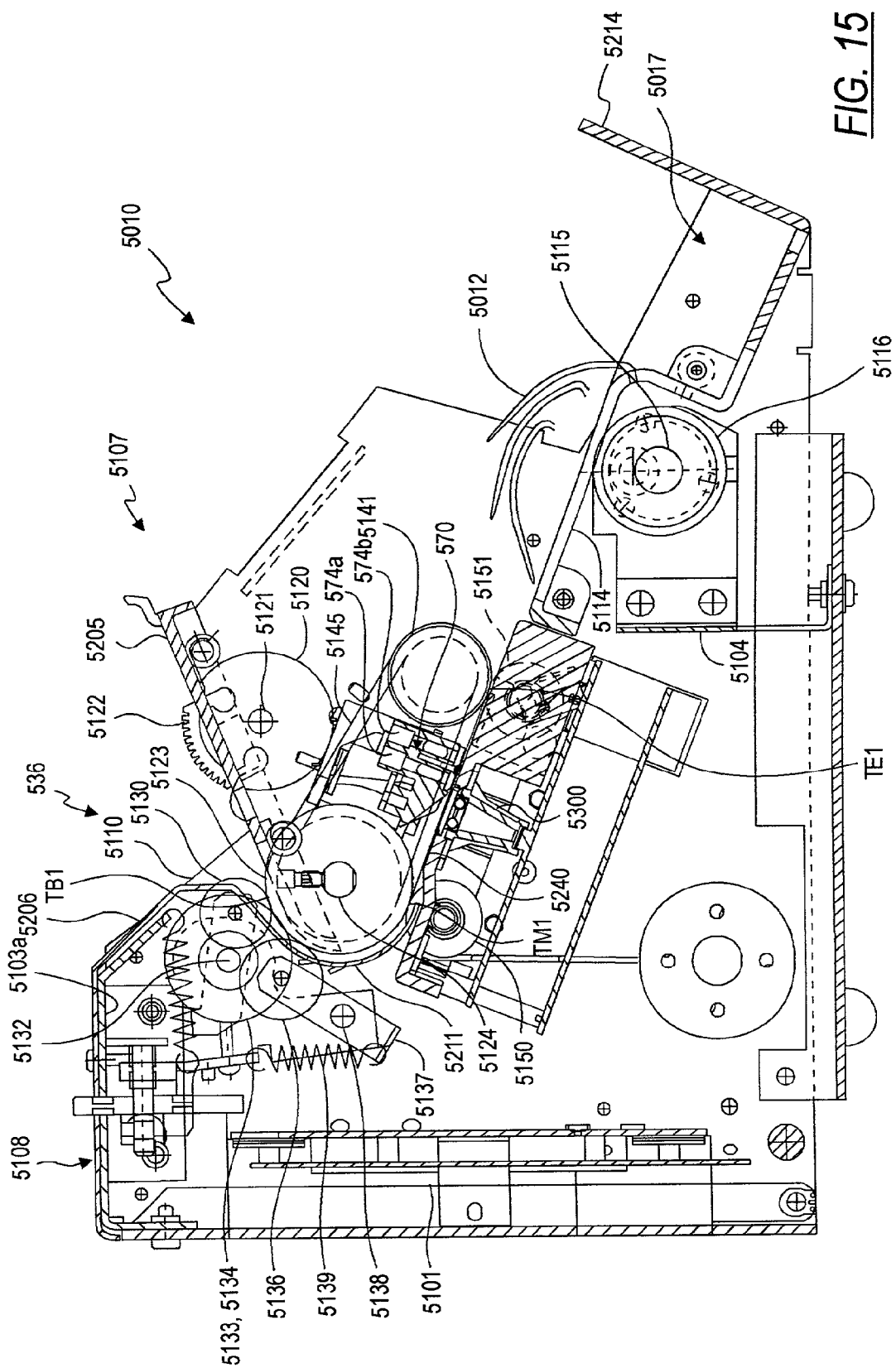
FIG. 15 is a sectional side view of the embodiment shown in FIG. 14.

FIGS. 14 and 15 depict a compact document processing system according to one embodiment of the present invention. One embodiment of a compact document processing system is described and illustrated in more detail in U.S. Pat. No. 5,687,963, which is incorporated herein by reference in its entirety. In FIGS. 14 and 15, documents are fed, one by one, from a stack of documents placed in an input receptacle 5209 into a transport mechanism. The transport mechanism includes a transport plate or guide plate 5240 for guiding a document to an output receptacle 5017. Before reaching the output receptacle 5017, the document can be, for example, scanned, evaluated, analyzed, counted, and/or otherwise processed by a full image scanning module. In one embodiment, documents such as checks or currency bills are transported, scanned, and identified at a rate in excess of 800 bills or documents per minute. In another embodiment, documents such as checks or currency bills are transported, scanned, and identified at a rate in excess of 1000 bills or documents per minute.

The input receptacle 5209 for receiving a stack of documents to be processed is formed by downwardly sloping and converging walls 5205, 5206 (see FIG. 15) formed by a pair of removable covers (not shown) which snap onto a frame. The converging wall 5206 supports a removable hopper (not shown) that includes vertically disposed side walls (not shown). U.S. Pat. No. 5,687,963 also describes one embodiment of an input receptacle in more detail. The document processing system 5010 in FIG. 16 has a touch panel display 5015 in one embodiment of the present invention which displays "functional" keys when appropriate. The touch panel display 5015 simplifies the operation of the multi-pocket document processing system 5010. Alternatively or additionally physical keys or buttons may be employed.

From the input receptacle 5209, the documents are moved in seriatim from a bottom of the stack along a curved guideway 5211 (shown in FIG. 15) which receives documents moving downward and rearward and changes the direction of travel to a forward direction. Although shown as being fed from the bottom, the documents can be fed from the top, front, or back of the stack. The type of feeding used could be friction feed, a vacuum feed, or any other method of feeding known to those skilled in the art. An exit end of the curved guideway 5211 directs the documents onto the transport plate 5240, which carries the documents through an evaluation section and to the output receptacle 5017.

Stacking of the documents in one embodiment is accomplished by a pair of driven stacking wheels 5212, 5213 for the output receptacle 5017. The stacker wheels 5212, 5213 are supported for rotational movement about respective shafts 5115 journalled on a rigid frame and driven by a motor (not shown). Flexible blades of the stacker wheels 5212, 5213 deliver the documents onto a forward end of a stacker plate 5214.

According to one embodiment, the document processing system 5010 is compact, having a height ($H_1$) of about 9½ to 10½ inches, a width ($W_1$) of about 10¾ to 11¾ inches, and a depth ($D_1$) of about 12 to 16 inches.

Figure 16:
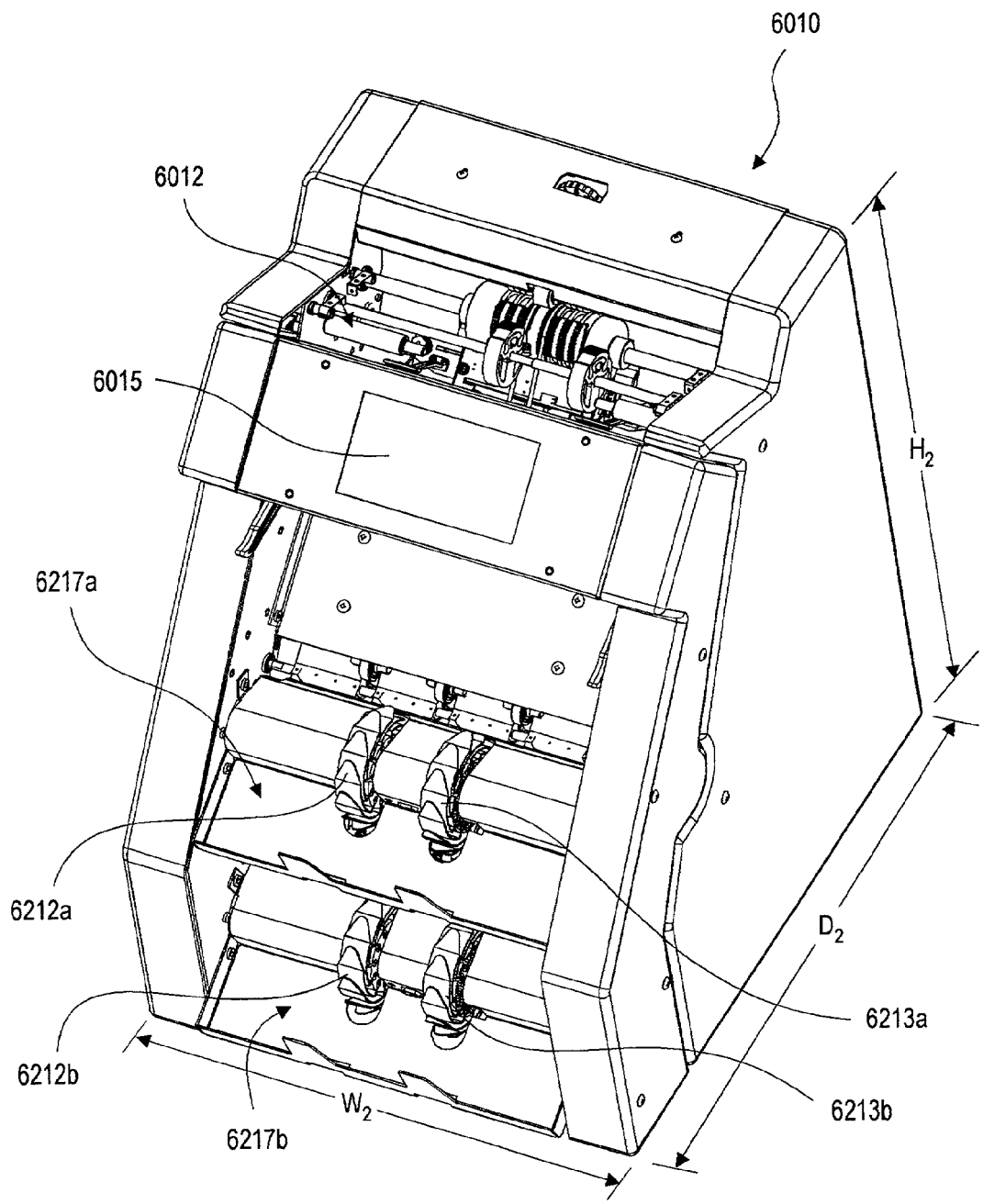
FIG. 16 is a perspective view of a compact document processing system according to principles of an embodiment of the present invention.
Figure 17:
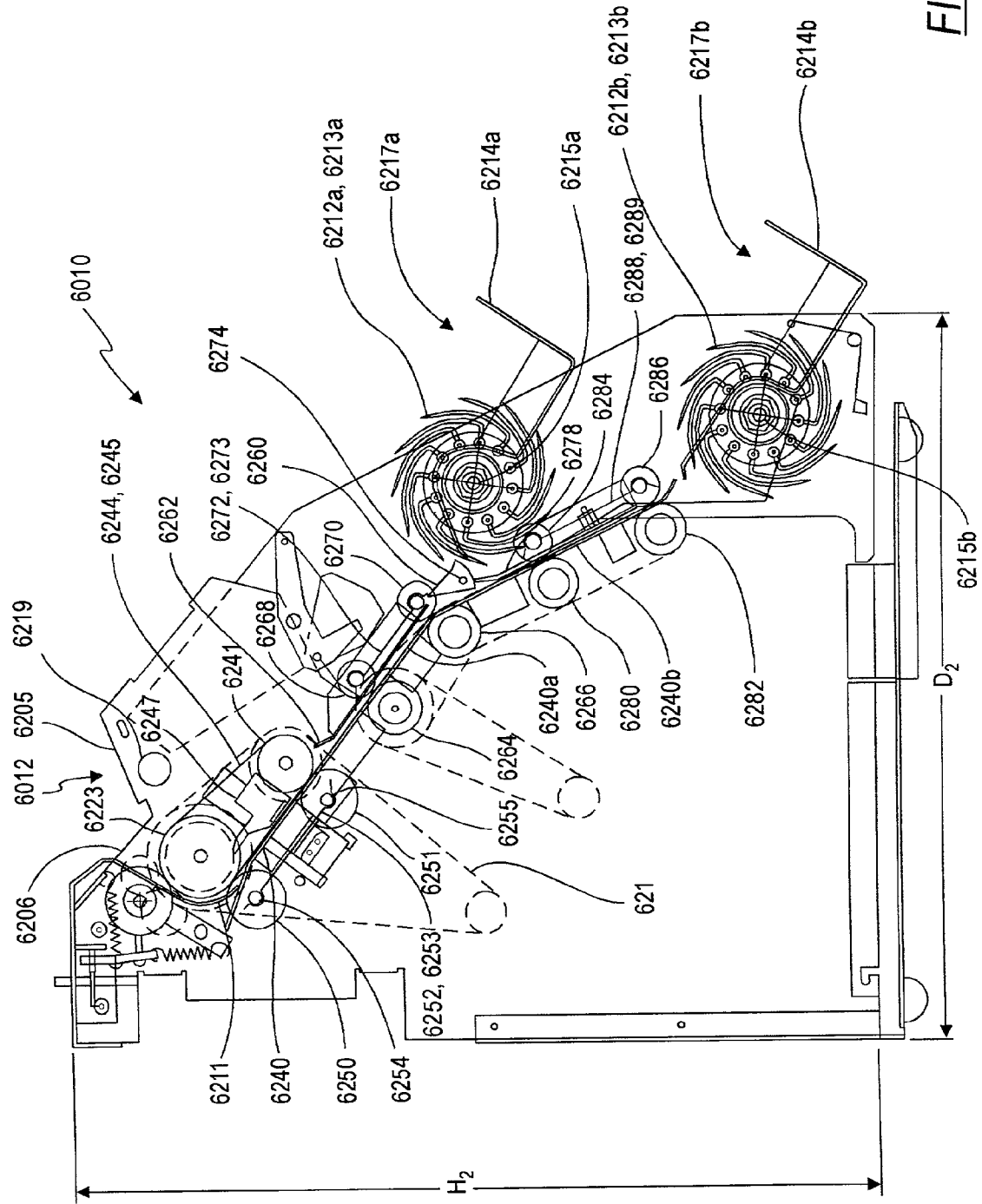
FIG. 17 is a side cross-sectional view of the embodiment shown in FIG. 16.

FIGS. 16 and 17 depict an exterior perspective view and a side cross-sectional view of a multi-pocket document processing system 6010. The process for carrying documents through the system is the same as discussed above, except that the processing system has two output receptacles 6217a, 6217b. In this embodiment, a diverter 6260 directs the documents to either the first or second output receptacle 6217a, 6217b. When the diverter is in a lower position, documents are directed to the first output receptacle 6217a. When the diverter 6260 is in an upper position, documents proceed in the direction of the second output receptacle 6217b.

According to one embodiment, the document processing system 6010 is compact, having a height ($H_2$) of about 17½ inches, a width ($W_2$) of about 13½ inches, and a depth ($D_2$) of about 15 inches. According to another embodiment, the processing system has dimensions of a height ($H_2$) of about 18 inches, a width ($W_2$) of about 13¾ inches, and a depth ($D_2$) of about 16 inches. The evaluation device 6010 may be rested on a tabletop.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An automated point-of-sale document processing system comprising:
    a document scanner located at a site of a customer transaction comprising:
        a slot adapted to accept a document associated with the customer transaction;
        means for presenting an authorization agreement to a customer, the authorization agreement authorizing the document to be processed in accordance with an automated account clearing process;
        an image scanner acquiring at least one image of the document; and
        means for tagging the document image with an indication of customer acceptance of the authorization agreement; and
    a communication interface coupled to a central document clearinghouse and adapted to communicate the tagged document image following customer authorization of the agreement to the central document clearinghouse for automated account clearing processing of the document.

2. The automated point-of-sale check processing system according to claim 1, wherein the image scanner further obtains field information from the document image, and wherein the communication interface communicates the field information along with the document image to the central clearinghouse for automated account clearing processing of the document.

3. The automated point-of-sale check processing system according to claim 1, further comprising means for customer authorizing the agreement using a printer for imprinting indicia of verbal authorization received from the customer on the document.

4. The automated point-of-sale check processing system according to claim 1, wherein the means for presenting an authorization agreement comprises means for imprinting the authorization agreement for the automated account clearing process on the document.

5. The automated point-of-sale check processing system according to claim 4, wherein the imprinting means comprises a stamp for stamping the authorization agreement on the document.

6. The automated point-of-sale check processing system according to claim 5, wherein the stamp further includes a promise to pay as well as the authorization agreement.

7. The automated point-of-sale check processing system according to claim 4, wherein the imprinting means includes a printer adapted to print an authorization agreement for the automated account clearing process on the document submitted by a customer.

8. The automated point-of-sale check processing system according to claim 1, wherein the means for presenting an authorization agreement comprises means for imprinting the authorization agreement for the automated account clearing process on a receipt for the customer transaction.

9. The automated point-of-sale check processing system according to claim 8, wherein the imprinting means comprises a stamp for stamping the authorization agreement on the receipt.

10. The automated point-of-sale check processing system according to claim 9, wherein the stamp further includes a promise to pay as well as the authorization agreement.

11. The automated point-of-sale check processing system according to claim 1, wherein means for presenting an authorization agreement comprises means for displaying the authorization agreement for the automated account clearing process to the customer.

12. The automated point-of-sale check processing system according to claim 11, further comprising an electronic signature pad and an electronic pen, the electronic signature pad adapted to receive a signature from the customer to execute the authorization agreement.

13. The automated point-of-sale check processing system according to claim 11, further comprising a data input device wherein the customer actuates the data input device to execute the authorization agreement.

14. The automated point-of-sale check processing system of claim 1, wherein the means for presenting an authorization agreement comprises a printer for printing the authorization agreement for the automated account clearing process on the document, further comprising a transport mechanism for conveying the document past the printed and returning the document to the customer for execution of the authorization agreement by the customer.

15. The automated point-of-sale check processing system of claim 14, further comprising a controller coupled to the transport mechanism.

16. The automated point-of-sale check processing system of claim 1, wherein the means for presenting an authorization agreement comprises a printer for printing the authorization agreement for the automated account clearing process on the document, and wherein the printer is further adapted to inscribe the document with an indicia of cancellation.

17. The automated point-of-sale check processing system of claim 16, wherein the slot is further adapted to return the canceled document to the customer at the site of the transaction.

18. The automated point-of-sale check processing system of claim 1, wherein the means for presenting an authorization agreement comprises a printer for printing the authorization agreement for the automated account clearing process on the document, further comprising a second printer adapted to inscribe the document with an indicia of cancellation.

19. The automated point-of-sale check processing system of claim 1, wherein the means for presenting an authorization agreement comprises a printer for printing the authorization agreement for the automated account clearing process on the document, further comprising a second printer adapted to inscribe the document with a transaction amount.

20. The automated point-of-sale check processing system according to claim 1, further comprising a printer adapted to imprint information on the document.

21. The automated point-of-sale check processing system of claim 1, further including an input device through which a transaction amount is keyed in, the document scanner further including means for recognizing a transaction amount in the imaged document and adapted to compare the recognized transaction amount against the keyed in transaction amount.

22. The automated point-of-sale check processing system of claim 1, further comprising at least one interface adapted to display information to an operator or the customer.

23. The automated point-of-sale check processing system of claim 22, the interface further adapted to receive a command from the operator or the customer.

24. The automated point-of-sale check processing system of claim 1, wherein the image scanner further comprises a single scanhead.

25. The automated point-of-sale check processing system of claim 1, wherein the image scanner further comprises multiple scanheads.

26. The automated point-of-sale check processing system of claim 1, wherein the image scanner further comprises:
 a mirror for receiving an image of a first side of the document;
 a single scanhead for receiving the image reflected from the mirror of the first side of the document and obtaining an image of the a second side of the document; and
 a transport mechanism for moving the document past the mirror and the single scanhead.

27. The automated point-of-sale check processing system of claim 1, wherein a plurality of documents are scanned and a plurality of document images are transmitted by the communication interface in a batch to the central document clearinghouse.

28. The automated point-of-sale check processing system of claim 1, wherein the document scanner transports and scans the document such that a longer edge of the document is perpendicular to the direction of transport.

29. The automated point-of-sale check processing system of claim 1, wherein the document scanner transports and scans the document such that a longer edge of the document is parallel to the direction of transport.

30. The automated point-of-sale check processing system of claim 1, whereby the document is a check.

31. A method of processing a document at the site of a customer transaction comprising the steps of:
 presenting an authorization agreement to a customer, the authorization agreement authorizing the document to be processed in accordance with an automated account clearing process;
 scanning the document to acquire an image thereof;
 tagging the document image with an indication of customer acceptance of the authorization agreement; and
 communicating the tagged image of the document following customer authorization of the agreement to a central document clearinghouse for automated account clearing processing of the document.

32. The method of claim 31, further comprising the step of checking the document for indicia of cancellation.

33. The method of claim 32, wherein the step of checking for indicia of cancellation is done prior to obtaining the agreement.

34. The method of claim 31, comprising the step of obtaining the agreement verbally from the customer.

35. The method of claim 34, comprising the step of imprinting indicia of the verbal agreement on the document.

36. The method of claim 31, further comprising the step of imprinting the agreement on the document.

37. The method of claim 36, wherein the step of imprinting comprises stamping the authorization agreement on the document.

38. The method of claim 37, wherein the imprinting further includes a promise to pay as well as an authorization agreement.

39. The method of claim 31, further comprising the step of imprinting the authorization agreement on a receipt associated with the customer transaction.

40. The method of claim 39, wherein the step of imprinting further includes stamping a promise to pay as well as an authorization agreement.

41. The method of claim 31, wherein the step of scanning further obtains field information from the document image, and wherein the step of communicating communicates the field information along with the document image to the central document clearinghouse for automated account clearing processing of the document.

42. The method of claim 31, further comprising the step of displaying the agreement to the customer on a video screen.

43. The method of claim 42, further comprising the step of obtaining an electronic signature from the customer to execute the authorization agreement.

44. The method of claim 42, further comprising the step of providing a button for the customer to press to execute the displayed authorization agreement.

45. The method of claim 31, further comprising the step of printing the authorization agreement on the document.

46. The method of claim 31, further comprising the step of returning the document to the customer for execution of the authorization agreement.

47. The method of claim 31, further comprising the step of inscribing the document with an indicia of cancellation.

48. The method of claim 47, further comprising the step of returning the cancelled document to the customer at the site of the transaction.

49. The method of claim 31, wherein the step of scanning comprises the step of scanning a plurality of documents to acquire a plurality of images thereof.

50. The method of claim 49, wherein the step of communicating comprises the step of transmitting the plurality of images to the central document clearinghouse in a batch.

51. The method of claim 31, further comprising the step of scanning the document such that a longer edge of the document is perpendicular to a direction of transport.

52. The method of claim 31, further comprising the step of scanning the document such that a longer edge of the document is parallel to the direction of transport.

53. The method of claim 31, further comprising the step of adding a transaction amount to the document.

54. An automated check processing system for accepting and processing checks from a customer comprising:
 a document scanning system including:
  means for presenting an authorization agreement to a customer, the authorization agreement authorizing a check to be processed in accordance with an automated account clearing process;
  an image scanner adapted to obtain images of checks;
  means for extracting MICR data from the check image;

means for tagging the check image with an indication of customer acceptance of the authorization agreement and the extracted MICR data; and a communication interface coupled to a central check clearinghouse and adapted to communicate the tagged check images following customer authorization of the authorization agreement to the central check clearinghouse where automated check clearing processing is preformed.

55. The automated check processing system according to claim 54, wherein the images obtained are full images of the checks.

56. The automated check processing system according to claim 54, wherein the images obtained are of selected portions of the checks.

57. The automated check processing system according to claim 54, wherein each document scanning system further comprises a printed adapter to print the authorization agreement on the checks.

58. The automated check processing system according to claim 57, wherein each document scanning system further comprises a transport mechanism for returning the checks printed with the authorization agreement to the customer.

59. The automated check processing system according to claim 58, further comprising a controller coupled to the transport mechanism.

60. The automated check processing system of claim 57, wherein the printer is further adapted to inscribe a transaction amount on the checks.

61. The automated check processing system of claim 54, wherein the image scanner scans an endorsement side of the checks.

62. The automated check processing system of claim 54, wherein the image scanner includes a single scanhead.

63. The automated check processing system of claim 54, wherein the checks have a first and a second side and the image scanner comprises:
a mirror for receiving images of the first side of the checks;
a single scanhead for receiving the image reflected from the mirror of the first side of the checks and obtaining an image of a second side of the checks; and
a transport mechanism for moving the checks past the mirror and the single scanhead.

64. The automated check processing system of claim 63, wherein the images scanned are full images of the checks.

65. The automated check processing system of claim 64, wherein the images scanned also include selected images of portions of the checks.

66. The automated check processing system of claim 63, wherein the images scanned are images of selected portions of the checks.

67. The automated check processing system of claim 54, wherein each document scanner further comprises a MICR reader for reading MICR data from the checks.

68. The automated check processing system of claim 54, wherein the image scanner comprises a first and a second scanhead.

69. The automated check processing system of claim 54, wherein each document scanner comprises a single acceptance and return slot.

70. The automated check processing system of claim 54, wherein the communication interface communicates a plurality of tagged images in a batch to the central check clearinghouse.

71. A method of accepting and processing checks from a customer comprising the steps of:

presenting an authorization agreement to a customer, the authorization agreement authorizing a check to be processed in accordance with an automated account clearing process;

obtaining images of checks fed into the document scanner;

extracting MICR data from the check images;

tagging the check images with the extracted MICR data; and communicating tagged check images following customer authorization of the authorization agreement to a central check clearinghouse where automated check clearing processing is performed.

72. The method of claim 71, including the step of obtaining full images of the checks.

73. The method of claim 71, further comprising obtaining field information from the check image, and wherein the step of communicating includes communicating the field information along with the check image to the central check clearinghouse for automated check clearing processing of the check.

74. The method of claim 71, further including the step of obtaining images of selected portions of the checks.

75. The method of claim 71, including the further step of scanning an endorsement side of the check.

76. The method of claim 71, wherein a plurality of check images are obtained and the step of communicating transmits the plurality of tagged images to the central check clearinghouse in a batch.

77. An automated check processing system for accepting and processing checks from a customer comprising:
a document scanning containing:
a document image scanner for obtaining images of the checks that are fed into the document scanning device;
a printer adapted to print an authorization agreement on the checks, the authorization agreement authorizing processing of the checks in accordance with an automated check clearing process, and inscribe a transaction amount on the checks in response to a customer purchase;
a transport mechanism for returning the checks with the imprinted agreement to the customer;
means for obtaining MICR field data from the check images and tagging the check images with the obtained MICR field data; and
a communication interface for coupling the document scanning device to a central check clearinghouse and communicating the tagged check images and field data to the central check clearinghouse for automated check clearing processing of the checks.

78. The automated check processing system according to claim 77, further comprising a controller coupled to the document image scanner and the transport mechanism for controlling the movement of the transport mechanism.

79. The automated check processing system of claim 77, wherein the document image scanner comprises a single scanhead.

80. The automated check processing system of claim 77, wherein the document image scanner comprises a first and a second scanhead.

81. The automated check processing system of claim 77, wherein the checks have a first and a second side and the document image scanner comprises:
a mirror for receiving images of the first side of the checks;

a single scanhead for receiving reflected images from the mirror of the first side of the checks and obtaining an image of the second side of the checks; and
a transport mechanism for moving the checks past the mirror and the single scanhead.

82. An automated point of sale processing system for processing customer transactions, comprising:
a video screen for displaying an authorization agreement to a customer, the authorization agreement authorizing a document to be processed in accordance with an automated account clearing process;
an electronic signature pad and an electronic pen, the electronic signature pad adapted to receive a signature from a customer approving the authorization agreement;
a document scanner located at a site of a customer transaction comprising a slot adapted to accept the document, the document scanner acquiring at least one image therefrom following customer approval of the authorization agreement and tagging the document image with the indicia of the customer's signature approving the authorization agreement; and
a communication link coupled to a central clearinghouse and adapted to communicate information represented by the at least one tagged image to the central clearinghouse for processing of the document in accordance with the automated account clearing process.

83. An automated point of sale processing system for processing customer transactions, comprising:
means for presenting an authorization agreement to a customer, the authorization agreement authorizing a document to be processed in accordance with an automated account clearing process;
means for customer authorizing the authorization agreement for the document to be processed in accordance with the automated account clearing process;
a document scanner located at a site of a customer transaction comprising a slot adapted to accept the document, the document scanner acquiring at least one image therefrom, after having obtained the authorization agreement from the customer and tagging the document image with the indicia of the customer's approving the authorization agreement;
a printer adapted to inscribe the document with indicia of cancellation; and
a communication link coupled to a central clearinghouse and adapted to communicate information represented by the at least one tagged image to the central clearinghouse for processing of the document in accordance with the automated account clearing process.

84. A method of processing a document at the site of a customer transaction comprising the steps of:
presenting an authorization agreement to a customer, the authorization agreement authorizing a document to be processed in accordance with an automated account clearing process when executed by the customer;
obtaining an executed authorization agreement from the customer;
scanning the document and acquiring an image therefrom;
tagging the document image with the indicia of the customer's executed approval of the authorization agreement;
checking the document for indicia of cancellation; and
communicating information represented by the tagged image of the document to a central clearinghouse for processing of the document in accordance with the automated account clearing process.

85. A method of processing a document at the site of a customer transaction comprising the steps of:
obtaining an executed authorization agreement from a customer by:
displaying the authorization agreement to the customer on a video screen, the authorization agreement authorizing a document to be processed in accordance with an automated account clearing process when executed by the customer; and
providing an electronic signature pad and electronic pen for receiving a signature from the customer to execute the authorization agreement;
scanning the document and acquiring an image therefrom;
tagging the document image with an indication of customer execution of the authorization agreement; and
communicating information represented by the tagged image of the document to a central clearinghouse for processing of the document in accordance with the automated account clearing process.

86. A method of processing a document at the site of a customer transaction comprising the steps of:
presenting an authorization agreement to a customer, the authorization agreement authorizing a document to be processed in accordance with an automated account clearing process when executed by the customer;
obtaining an executed authorization agreement from the customer;
scanning the document and acquiring an image therefrom;
tagging the document image with an indication of customer execution of the authorization agreement;
inscribing the document with indicia of cancellation; and
communicating information represented by the tagged image of the document to a central clearinghouse for processing of the document in accordance with the automated account clearing process.

87. A method of processing a document at the site of a customer transaction comprising the steps of:
presenting an authorization agreement to a customer, the authorization agreement authorizing a document to be processed in accordance with an automated account clearing process when executed by the customer;
obtaining an executed authorization agreement from the customer;
scanning the document and acquiring an image therefrom;
tagging the document image with an indication of customer execution of the authorization agreement;
adding a transaction amount to the document; and
communicating information represented by the tagged image of the document to a central clearinghouse for processing of the document in accordance with the automated account clearing process.

88. An automated check processing system for accepting and processing checks from a customer comprising:
a printer adapted to inscribe a transaction amount on checks;
means for presenting an authorization agreement to a customer, the authorization agreement authorizing the checks to be processed in accordance with an automated account clearing process;
a plurality of document scanners, the document scanners adapted to obtain images of checks and extract MICR data from the imaged checks, wherein the checks are fed into the document scanners;
means for tagging the document image with an indication of customer acceptance of the authorization agreement and the extracted MICR data; and a communication link coupled to a central clearinghouse and adapted to communicate the tagged images to the central clearinghouse for processing of the checks in accordance with the automated account clearing process.

89. An automated check processing system for accepting and processing checks from a customer purchasing merchandise having a transaction amount, the system comprising:
   a plurality of document scanners, the document scanners adapted to obtain images of checks having a first side and a second side, the checks being fed into the document scanners, wherein the scanners obtain images of a first side of the checks and extract MICR data therefrom, a transport mechanism for transporting the checks to and from the customer, a printer adapted to print an authorization agreement and inscribe the transaction amount of the checks, and a controller coupled to the transport mechanism and the document scanners and operable to tag check images with the extracted MICR data;
   means for presenting the authorization agreement to the customer, the authorization agreement authorizing the checks to be processed in accordance with an automated account clearing process;
   a processor for storing the MICR data and check images in a memory; and
   a communication link coupled to a central clearinghouse and adapted to communicate the tagged image files to the central clearinghouse for processing of the checks in accordance with the automated account clearing process.

90. A check clearing system, comprising:
   a point of sale processing unit including:
      a slot into which a check used by a customer in connection with a purchase is deposited;
      means for presenting an authorization agreement to the customer, the authorization agreement authorizing the check used for the purchase to be processed in accordance with an automated account clearing process;
      an imager operable to obtain an image of the deposited check;
      a transport mechanism that conveys the deposited check from the slot past the imager;
      a processor operable to extract MICR data from the check image and tag the check image with the MICR data and an indication of customer acceptance of the authorization agreement; and
      an interface through which the point of sale processing unit outputs the tagged check images;
   a communications link connected to the interface;
   a central check clearinghouse connected to the communication link and operable to process the output tagged check images and implement the automated check clearing process for the purchase.

91. The system of claim 90 wherein the means for presenting an authorization agreement to the customer comprises:
   a printer for printing the authorization on the check;
   the transport mechanism conveying the deposited check from the slot past the printer.

92. The system of claim 91 wherein the transport mechanism further conveys the deposited check printed with the authorization agreement back to the slot for delivery to the customer.

93. The system of claim 90 wherein the means for presenting an authorization agreement to the customer comprises a display upon which the authorization agreement is presented to the customer; and
   wherein the means for customer authorizing comprises an input through which the customer authorizes the authorization agreement.

94. The system of claim 93 wherein the input is an acknowledgment key.

95. The system of claim 93 wherein the input is an electronic signature capture device.

96. The system of claim 90 wherein the means for presenting an authorization agreement to the customer comprises:
   a printer for printing customer authorization of the authorization agreement on the check;
   the transport mechanism conveying the deposited check from the slot past the printer.

97. The system of claim 90 wherein the point of sale processing unit further includes a printer indicia of cancellation on the deposited check, the transport mechanism conveying the deposited check from the slot past the printer.

98. The system of claim 90 wherein the point of sale processing unit further includes a printer for printing indicia of a transaction amount for the purchase on the deposited check, the transport mechanism conveying the deposited check from the slot past the printer.

99. The system of claim 90 wherein the point of sale processing unit further includes optical character recognition means for processing the check images to extract field information, the interface outputting the field information along with the check images, the central check clearinghouse processing the field information and check images in connection with implementation of the automated check clearing process for the purchase.

100. The system of claim 90 wherein the imager includes a single scanhead.

101. The system of claim 100 wherein the imager captures images of each side of the deposited check.

102. The system of claim 90 wherein the imager includes two scanheads.

103. The system of claim 90 wherein the transport mechanism further conveys the deposited check following imaging back to the slot.

104. The system of claim 90 wherein the system includes a plurality of point of sale processing units networked through the communication link to the central check clearinghouse.

* * * * *